US008515719B2

(12) United States Patent
Tamaki et al.

(10) Patent No.: US 8,515,719 B2
(45) Date of Patent: *Aug. 20, 2013

(54) APPARATUS ANOMALY MONITORING METHOD AND SYSTEM

(75) Inventors: Kenji Tamaki, Kawasaki (JP); Toshiharu Miwa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 201 days.
This patent is subject to a terminal disclaimer.

(21) Appl. No.: 13/144,295

(22) PCT Filed: Jan. 14, 2009

(86) PCT No.: PCT/JP2009/050385
§ 371 (c)(1),
(2), (4) Date: Jul. 29, 2011

(87) PCT Pub. No.: WO2010/082322
PCT Pub. Date: Jul. 22, 2010

(65) Prior Publication Data
US 2011/0276828 A1    Nov. 10, 2011

(51) Int. Cl.
*G06G 7/48* (2006.01)

(52) U.S. Cl.
USPC .................................. 703/6; 703/2

(58) Field of Classification Search
None
See application file for complete search history.

(56) References Cited

U.S. PATENT DOCUMENTS

| 6,061,640 | A | 5/2000 | Tanaka et al. | |
| 7,209,846 | B2 | 4/2007 | Tamaki et al. | |
| 7,937,164 | B2 * | 5/2011 | Samardzija et al. | 700/28 |
| 8,032,341 | B2 * | 10/2011 | Miller | 703/2 |

FOREIGN PATENT DOCUMENTS

| JP | 6-187030 | 7/1994 |
| JP | 2000-252180 | 9/2000 |
| JP | 2002-110493 | 4/2002 |
| JP | 2007-026134 | 2/2007 |
| JP | 2008-072047 | 3/2008 |
| JP | 2008-204282 | 9/2008 |

OTHER PUBLICATIONS

ISBN: 978-0412830402 J. M. Chambers, et al., Statistical Model in s, Chapman & Hall/CRC (1991), Chapter 6: generalized Linear Models, Chapter 7: Generalized Additive Models, Chapter 10: Nonlinear Models.
ISBN: 978-0387952840 T. Hastie et al., The elements of Statistical Learning: Data Mining, Inference, and Prediction, Second Edition (Springer Series in Statistics), Springer (2003), Chapter3: Linear Method for Regression.
ISBN: 0-471-48978-6, Richard G. Brereton, Chemometrics, Data Analysis for the Laboratory and Chemical Plant, Wiley (2003), Chapter 5: 5.5 Partial Least Squares.
ISBN: 978-0387310732 Christopher M. Bishop, Pattern Recognition and Machine Learning, Springer (2006), Chapter 8: Graphical Models.
Haitao Liao, et al., Predicting remaining useful life of an individual unit using proportional hazards model and logistic regression model, IEEE RAMS '06, Annual Reliability and Maintainability Symposium, 2006, pp. 127-132.

* cited by examiner

*Primary Examiner* — Omar Fernandez Rivas
*Assistant Examiner* — Herng-Der Day
(74) *Attorney, Agent, or Firm* — Antonelli, Terry, Stout & Kraus, LLP.

(57) ABSTRACT

In an apparatus anomaly monitoring system, a model creation module (2) creates an ensemble of models formed of predictive models of an objective variable (Y) for each explanatory variable (X) based on regression analysis with using a plurality of state data items (DS) measured from an apparatus (1) to be a target. With using this, a monitoring execution module (3) monitors a state of the apparatus (1) to detect the anomaly. More particularly, the explanatory variables (X) are categorized into a collinearity item (XA) and an independency item (XB) to create an individual model for each of the collinearity items (XA) with using the collinearity item (XA) and the independency item (XB). With using the ensemble of these models, a predicted value of the objective variable (Y), an error span between the predicted value and a measurement value, an ensemble error span, and others are computed.

17 Claims, 25 Drawing Sheets

FIG. 12

| PARAMETER<br>CATEGORIZATION | P1(Y) | P2(XA1) | P3(XA2) | P4(XB) | ... |
|---|---|---|---|---|---|
| OBJECTIVE VARIABLE | 1 | 0 | 0 | 0 | ... |
| EXPLANATORY VARIABLE | 0 | 1 | 1 | 1 | ... |
| COLLINEARITY | - | 1 | 1 | 0 | ... |
| INDEPENDENCY | - | 0 | 0 | 1 | ... |

FIG. 13

| PARAMETER<br>MODEL NAME | INTERCEPT | P1 | P2 | P3 | P4 | ... |
|---|---|---|---|---|---|---|
| MODEL 1 | 0.1 | - | 1.2 | - | 0.9 | ... |
| MODEL 2 | 0.0 | - | - | 1.1 | 1.0 | ... |
| MODEL 3 | ... | ... | ... | ... | ... | ... |

FIG. 14

|    | P1  | P2  | P3  | P4  |
|----|-----|-----|-----|-----|
| P1 | 1   | 0.9 | 0.8 | 0.3 |
| P2 | 0.9 | 1   | 0.7 | 0.1 |
| P3 | 0.8 | 0.7 | 1   | 0.1 |
| P4 | 0.3 | 0.1 | 0.1 | 1   | ate measurement data (sensor data).

APPARATUS ANOMALY MONITORING METHOD AND SYSTEM

TECHNICAL FIELD

The present invention relates to an apparatus anomaly monitoring method of monitoring and judging an anomaly (anomaly sign) or normality in a state of a target apparatus, and more particularly, the present invention relates to a method of monitoring, judging, diagnosing, instructing for a maintenance operation, or others with using a model created based on an apparatus-state measurement data (sensor data).

BACKGROUND ART

For an apparatus (facility) converting fuel to at least kinetic energy, thermal energy, or electrical energy, which is represented by a cogeneration apparatus, there is a technique of Condition Based Maintenance (CBM) in which a plurality of sensors (measuring instruments) for measuring the state is provided to measure and recognize each state of the apparatus every second, judge normality or anomaly in the state of the apparatus based on its data (referred to as apparatus state measurement data (state data), sensor data, or others), take an anomalous state, and perform maintenance. This is effective for reducing a maintenance cost.

Japanese Patent Application Laid-Open Publication No. 2002-110493 (Patent Document 1) and Japanese Patent Application Laid-Open Publication No. 2000-252180 (Patent Document 2) describe a method of multistage multivariate analysis which repeats an operation in multi stages, the operation for quality-variation cause analysis in a manufacturing line, in which a plurality of explanatory variables are divided into a certain small number, linear multiple regression model creation (Yi=A·Xi) is applied to all divided groups, the explanatory variable is narrowed down in each divided group by a forward selection method, and the narrowed-down explanatory variables are combined together to apply the multiple regression model creation again.

U.S. Pat. No. 7,209,846 (U.S. Pat. No. 7,209,846 B2) (Patent Document 3) describes a method of a causation analysis between a product quality and a process data in a manufacturing line with using a graphical model.

Non-Patent Document 1 describes a statistical model. More specifically, it describes a GLM (Generalized Linear Model) method, a GAM (Generalized Additive Model) method, and a non-linear model method.

Non-Patent Document 2 describes a plurality of methods of creating a degenerate linear regression model (Y=A·X) for an objective variable (Y) and an explanatory variable (X) based on a Projection Method for avoiding a non-computable problem and insufficient accuracy due to a Multiple Co-linear phenomenon caused by simultaneous shift of a plurality of elements of the explanatory variable. More specifically, it describes a PLS (Partial Least Squares) method, a PCR (Principal Component Regression) method, a Ridge method, and a Lasso method. Also, as a method of creating a nonlinear-relation model, it describes a nonlinear regression method. More specifically, it describes a GLM (Generalized Linear Model) method and a MARS (Multivariate Adaptive Regression Splines) method.

Non-Patent Document 3 describes a method of constructing a linear regression prediction model by mixing collinear data items with using a PLS (Partial Least Squares) method.

Non-Patent Document 4 describes a method of a statistical-mathematical general-purpose algorithm for a causation analysis with using a graphical model.

Non-Patent Document 5 describes a method of computing a lifetime of a part with using a proportional hazards model and a logistic regression model which is one type of the GLM.
Patent Document 1: Japanese Patent Application Laid-Open Publication No. 2002-110493
Patent Document 2: Japanese Patent Application Laid-Open Publication No. 2000-252180
Patent Document 3: U.S. Pat. No. 7,209,846 (U.S. Pat. No. 7,209,846 B2)
Non-Patent Document 1: ISBN: 978-0412830402 J. M. Chambers, and T. J. Hastie, "Statistical Models in S", Chapman & Hall/CRC (1991), Chapter 6: Generalized Linear Models, Chapter 7: Generalized Additive Models, Chapter 10: Nonlinear Models
Non-Patent Document 2: ISBN: 978-0387952840 T. Hastie, R. Tibshirani, and J. H. Friedman, "The Elements of Statistical Learning", Springer (2003), Chapter 3: Linear Methods for Regression
Non-Patent Document 3: ISBN: 0-471-48978-6, Richard G. Brereton, "Chemometrics, Data Analysis for the Laboratory and Chemical Plant", WILEY (2003), Chapter 5: 5.5 Partial Least Squares
Non-Patent Document 4: ISBN: 978-0387310732 Christopher M. Bishop, "Pattern Recognition and Machine Learning", Springer (2006), Chapter 8: Graphical Models
Non-Patent Document 5: Haitao Liao, Wenbiao Zhao, and Huairui Guo, "Predicting remaining useful life of an individual unit using proportional hazards model and logistic regression model", IEEE RAMS '06, Annual Reliability and Maintainability Symposium, 2006. pp. 127-132

DISCLOSURE OF THE INVENTION

Problems to be Solved by the Invention

In order to effectively perform the condition based maintenance (CBM), it is necessary to take an anomaly sign before leading to a failure. For this, it is effective to use a method of creating a model for integrating data items of a plurality of sensors by statistical analysis, computing an error span based on a model in an apparatus normal state, and setting the error span as a state judgment reference.

Most of modules each configuring the target apparatus and parts configuring the individual modules are coordinately operated in order to achieve an aim of the energy conversion or others by the apparatus. Therefore, most of outputs (data items) of the plurality of sensors placed for the plurality of parts configuring the apparatus are also coordinately changed. In this case, when a parametric space that the data items of each sensor are plotted on an axis is considered, the apparatus normal state forms a localized subspace. If the parametric subspace in the apparatus normal state is modeled by the statistical analysis, the error span for judging the anomalous state can be computed.

Regarding the above-described technique, there are problems (Problems 1 to 3) as described below.

(Problem 1) Firstly, there is a problem that the regression analysis is difficult due to collinearity. By categorizing state-data items (apparatus-state-measurement data items) corresponding to each axis of the parametric space into an objective variable (Y) and explanatory variable (X), the apparatus-normal-state parametric subspace can be modeled with the regression analysis (Y=A·X). As the objective variable (Y), an output or an efficiency of the apparatus may be set. At this time, most of the data items of the explanatory variable (X) are coordinately shifted, and therefore, a phenomenon called multicollinearity in the mathematical statistics is caused to make the regression analysis difficult. More specifically, a computation of the least-squares method in the linear regression analysis diverges. A method of solving this problem is broadly divided into two methods of a variable selection regression method and a degenerate regression method.

In the variable selection regression method (variable selection method), by selecting the explanatory variable (X) depending on cases, the occurrence of the multicollinearity is prevented. The above-described Patent Document 1 and Patent Document 2 describe a multistage regression method for increasing an accuracy of the variable selection, in which an ensemble of variables is divided into groups, the variables are selected depending on cases in each group by a forward selection method, and its results are synthesized to perform the regression analysis again. However, when the variable selection method is applied to apparatus monitoring (condition based maintenance), there is a problem that data items selected depending on cases in the apparatus normal state are out of a monitoring target. Even for the data items selected in the apparatus normal state because of a low contribution for prediction accuracy of the objective variable (Y), a possibility of the shift in an apparatus anomalous state cannot be thrown out. A parametric subspace model in the apparatus normal state by which an apparatus-state monitoring network covers all data items has been desired.

In the degenerate regression method, virtual latent variables are synthesized by using all explanatory variables (X), and then, the regression analysis is performed. Since the latent variables are independently synthesized from each other, the computation of the regression analysis does not diverge. The above-described Non-Patent Document 2 and Non-Patent Document 3 describe degenerate regression methods including a PLS method. When the degenerate regression method is applied to the apparatus monitoring (condition based maintenance), all data items can be the monitoring target. However, since the multicollinearity data items are synthesized by using averaging computation when the latent variables are synthesized, there is a problem that, when the monitoring is performed by using the degenerate regression model, an anomaly sign of a single data item or a group of a small number of data items cannot be detected with high sensitivity. A parametric subspace model in the apparatus normal state by which both an anomaly span of the single data item and an anomaly span of the group of the plurality of data items can be detected with high accuracy has been desired.

Also, in a statistical model of integrating a plurality of data items, there is also a problem that it is difficult to feed back designing knowledge about the apparatus and experiences and knowledge based on failure cases in order to improve the anomaly detection accuracy.

(Problem 2) Secondly, regarding the above-described technique, there is a problem that the apparatus maintenance operation is inefficient because a cause (module or part) of the apparatus anomaly is unknown. That is, even if necessity of the apparatus maintenance is recognized by detecting the anomaly sign of the apparatus from the error span from the parametric subspace model in the apparatus normal state, it is unknown which part in which module configuring the apparatus is to be maintained. In order to efficiently perform the apparatus maintenance in a short period of time, it has been desired to estimate the cause of the anomaly.

(Problem 3) Thirdly, regarding the above-described technique, there is a problem that the apparatus maintenance cannot be planed well and is inefficiency because details of lifetime (endurance time) or others of the anomalous module or part is unknown. That is, even if the necessity of the apparatus maintenance is recognized by detecting the anomaly sign of the apparatus from the error span from the parametric subspace model in the apparatus normal state and it is recognized which module or part is to be maintained, it is unknown by when the maintenance is to be performed (maintenance timing). In order to optimally determine the maintenance timing for the efficiency, it has been desired to estimate the lifetime or others of the anomalous part and optimally plan and perform the maintenance based on the estimated value.

For the problems as described above, the present invention has preferred aims (Aims 1 to 3) as described below.

(Aim 1) Firstly, in monitoring the target apparatus having the data items (apparatus-state-measurement data items) from the plurality of sensors being coordinately shifted, a preferred aim is to provide a model and a technique with using the model in which all data items are monitored, and, even if the single data item causes the anomaly span or the plurality of data items cause the anomaly span, the anomaly (anomaly sign) can be detected with high accuracy.

(Aim 2) Secondly, a preferred aim is to provide a technique capable of estimating the part or others of the cause of the anomaly from the detection of the anomaly sign of the apparatus as a starting point and outputting information of a candidate to efficiently perform the apparatus maintenance in the short period of time.

(Aim 3) Thirdly, a preferred aim is to provide a technique capable of computing the lifetime or others of the part or others of the cause of the anomaly from the detection of the anomaly sign of the apparatus as a staring point and outputting information for the maintenance plan.

The present invention has been made in view of the problems as described above, and is summarized that preferred aims of the present invention relate to the apparatus anomaly monitoring method and the technique of the condition based maintenance described above, and are to provide techniques capable of achieving (1) a model and monitoring with using the model capable of the anomaly detection with high accuracy, (2) further, the efficiency of the maintenance by the estimation of the part or others of the cause of the anomaly, (3) still further, the efficient maintenance plan by recognizing the lifetime or others of the estimated part or others.

Means for Solving the Problems

In order to achieve the preferred aims, a typical embodiment of the present invention relates to an apparatus anomaly monitoring method and its system, and has a feature of a structure described below.

The embodiment basically relates to a method and system in which, by using information processing of a computer, a state of a target apparatus (such as a facility or a system) is monitored by using data (state-data items) measured by a plurality of (three or more) sensors, a model (referred to as predictive model, monitored model, or others) is previously created by using these data (state-data items) based on the regression analysis, the anomaly (anomaly sign) of the apparatus is detected (judged) based on the data (state-data items) collected in each predetermined time unit and the model, and besides, a content of the anomaly is diagnosed (more particularly, an anomaly position is estimated) and the maintenance operation based on these results is instructed. The embodiment has a feature that a plurality of state-data items of the apparatus are categorized, relations therebetween are modeled to create a model for each explanatory variable, so that the monitoring, the judgment, the diagnosis, the instruction of the maintenance operation, and others described above are performed based on a plurality of predicted values obtained by the plurality of models (ensemble of models) and ensemble relations therebetween.

(1) The embodiment is for an apparatus anomaly monitoring method of monitoring and judging the anomaly of the state of the apparatus by using information processing of the computer based on the plurality of state-data items of the target apparatus obtained by measuring the state of the target apparatus by using the plurality of sensors. The method includes: a first step for a model creating process of creating models for the monitoring and judgment based on the plurality of state-data items of the apparatus at a normal time of the apparatus; and a second step for a monitoring performance process of inputting the plurality of state-data items of the apparatus in each predetermined time unit, monitoring and judging the anomaly of the state of the apparatus by using the models, and outputting detection information when the anomaly is detected.

And, the first step includes: a step of (statistically) categorizing the plurality of state data items into (one or more) objective-variable data item (Y) and two or more explanatory-variable data items (X) other than the objective-variable data item (Y) in the regression analysis; and a step of configuring the ensemble of the models by creating an individual model of predicting the objective-variable data item (Y) from one explanatory-variable data item (X) for each of the explanatory variable data items (X) as two or more individual models configuring the ensemble of the models.

And, the second step includes: in a new (the latest) input of the plurality of state-data items, a step of computing an individual predicted value of the objective-variable data item (Y) for each of the individual models configuring the ensemble of the models so as to have the explanatory-variable data item (X) as the input; a step of computing, for each of the individual predicted values, an individual error span (predicted error span) between the predicted value and a measurement value of the objective-variable data item (Y); a step of computing an ensemble error span obtained by combining the plurality of error spans obtained for each of the explanatory-variable data items (X); and a step of detecting the anomaly of the apparatus by comparing the ensemble error span and a threshold.

More particularly, the first step includes a step of categorizing the two or more explanatory-variable data items into a collinearity data item having a large cross-correlation strength and (any number of) independency data items other than the collinearity data item. In the step of creating the two or more individual models configuring the ensemble of the models, the individual model of predicting the objective-variable data item from one collinearity explanatory-variable data item is created for each of the collinearity explanatory-variable data items.

(2) In another embodiment, the method includes a third step of diagnosing the content of the anomaly of the apparatus based on the detection information obtained when the anomaly is detected in the second step. In the third step, state-data items causing a state that the ensemble error span exceeds the threshold are ranked and specified as the candidates, and information representing the candidates of the cause is outputted.

(3) In still another embodiment, the method includes a fourth step of computing the lifetime of the part of the apparatus, which is associated with the data items of the cause, based on the information representing the candidates of the cause obtained in the third step, and outputting information about the lifetime.

(4) In still another embodiment, the method includes a fifth step of creating information about the maintenance plan including a schedule for the maintenance operation of the apparatus for the part by a maintenance operator by using the information about the lifetime of the part obtained in the fourth step, and outputting the information as a maintenance operation instruction.

Effects of the Invention

According to a typical embodiment of the present invention, the present invention relates to the apparatus anomaly monitoring method and the technique of the condition based maintenance, and can achieve: (1) a model and monitoring the model capable of anomaly detection with high accuracy, (2) further, efficiency of the maintenance by estimating a part or others of a cause of the anomaly, and (3) still further, an efficient maintenance plan by recognizing a lifetime or others of the estimated part or others.

Regarding the above-described (1), more particularly, a model (predictive model) for detecting the anomaly sign of the apparatus from the sensor data can be always stably created by taking the model as an ensemble of individual models for each collinearity data item.

Also, by the ensemble of individual models, linear models and non-linear models can be mixed. More generally, a plurality of types of models can be mixed.

Further, by computing the error span of the predicted value of each of the models from the measurement value thereof and computing a distribution or statistic of an ensemble of the error spans, the apparatus anomaly sign can be detected with high accuracy. More particularly, by combining an ensemble average value and an ensemble maximum value together, the apparatus anomaly sign can be detected with high accuracy, and besides, a spread magnitude of the occurrence of the anomaly span can be simultaneously detected. Still further, by using a statistical-distribution quantile instead of the ensemble maximum value, reliability of the anomaly judgment can be increased in some cases. Still further, by individually normalizing the individual error spans, the ensemble error span to which the apparatus knowledge is reflected is computed, so that the accuracy of the anomaly detection can be increased.

Regarding the above-described (2), more particularly, by performing the causation analysis as taking the detection of the anomaly sign of the apparatus as a start point, the anomaly-detected data items can be rapidly ranked, and an associated part being the candidate of the anomaly cause phenomenon can be specified, so that the maintenance operation can be efficient.

Regarding the above-described (3), more particularly, by computing the lifetime of the candidate part of the cause of the anomaly as taking the detection of the anomaly sign of the apparatus as a start point, an optimum maintenance plan can be made without insufficiency, so that the maintenance operation can be efficient.

BRIEF DESCRIPTIONS OF THE DRAWINGS

Figure 7:
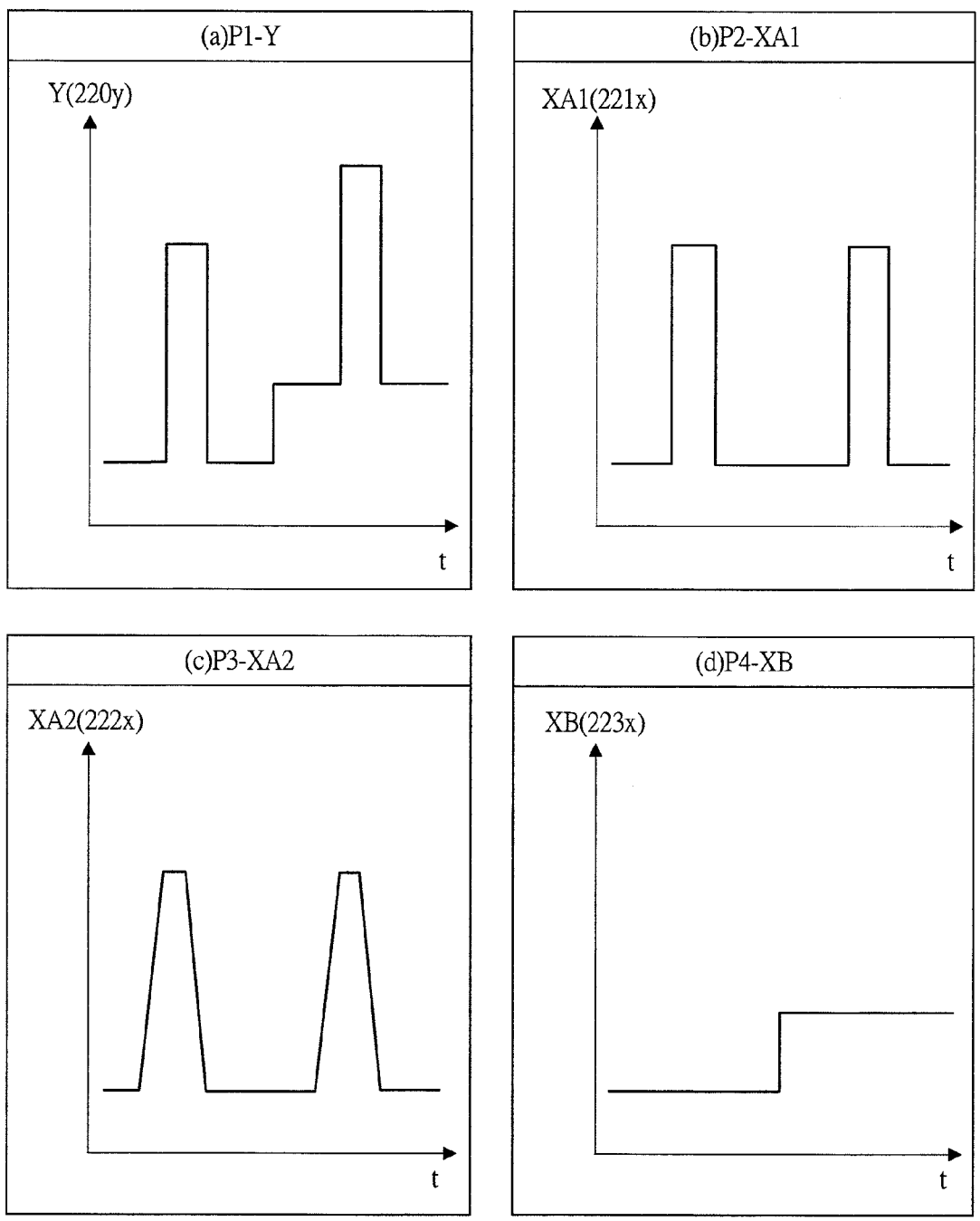
Figure 8:
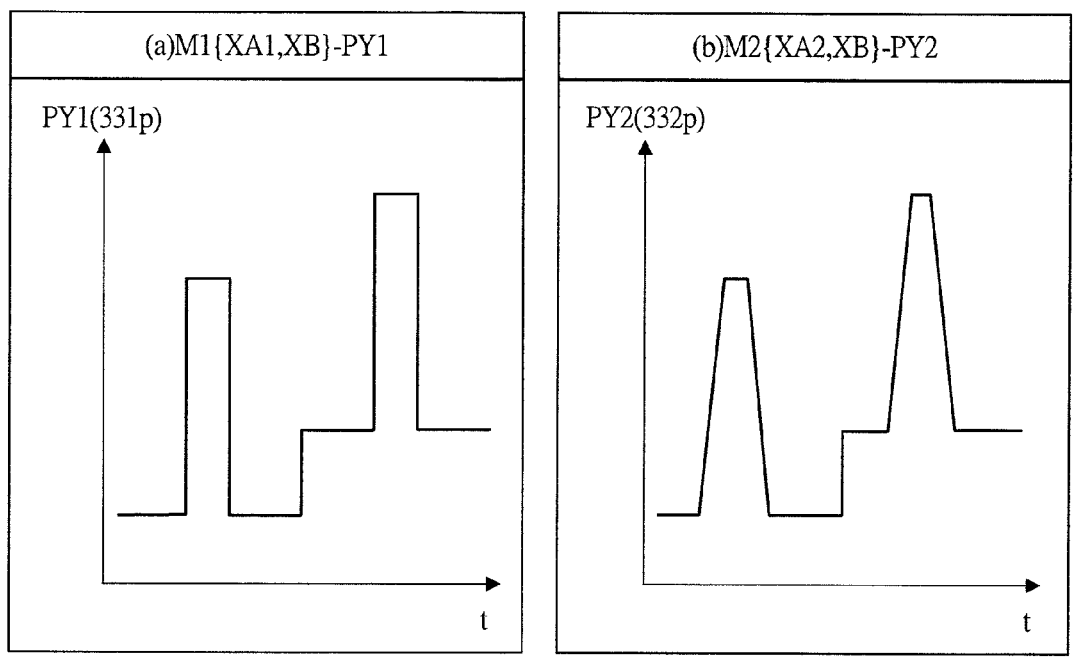
Figure 9:
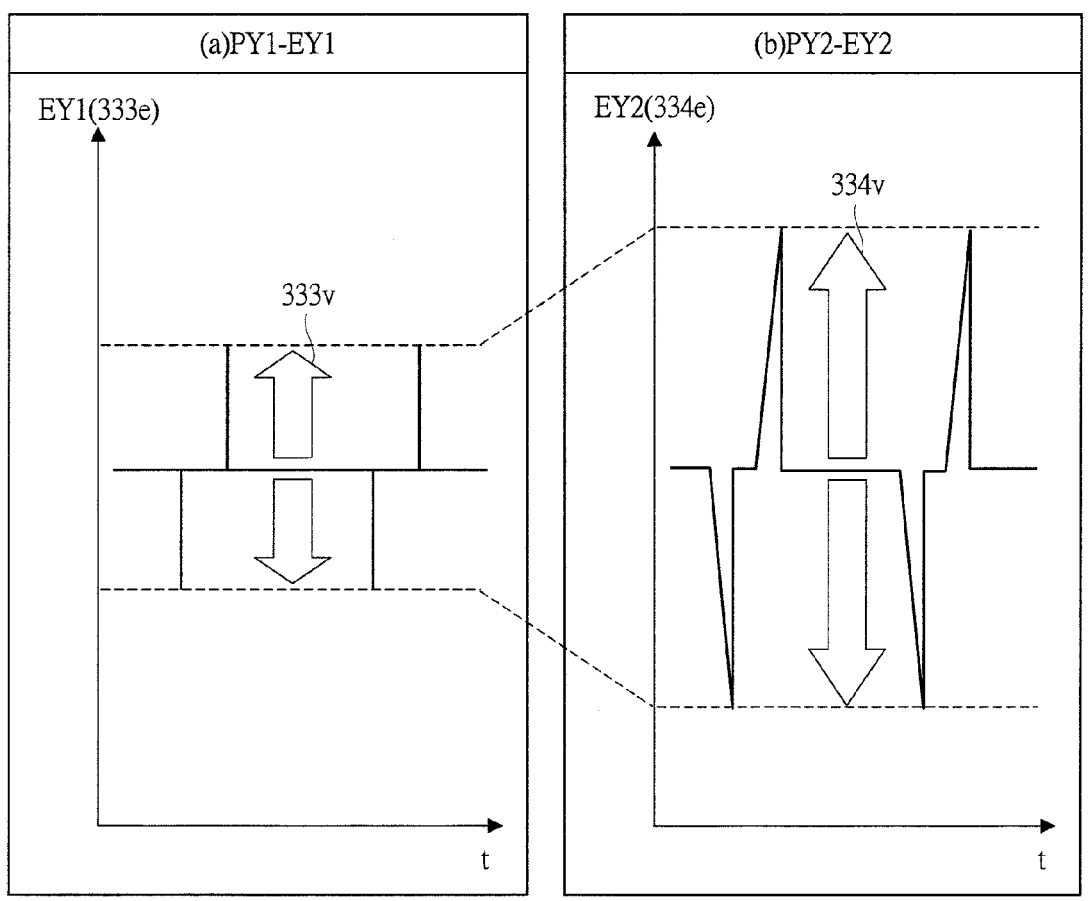
Figure 10:
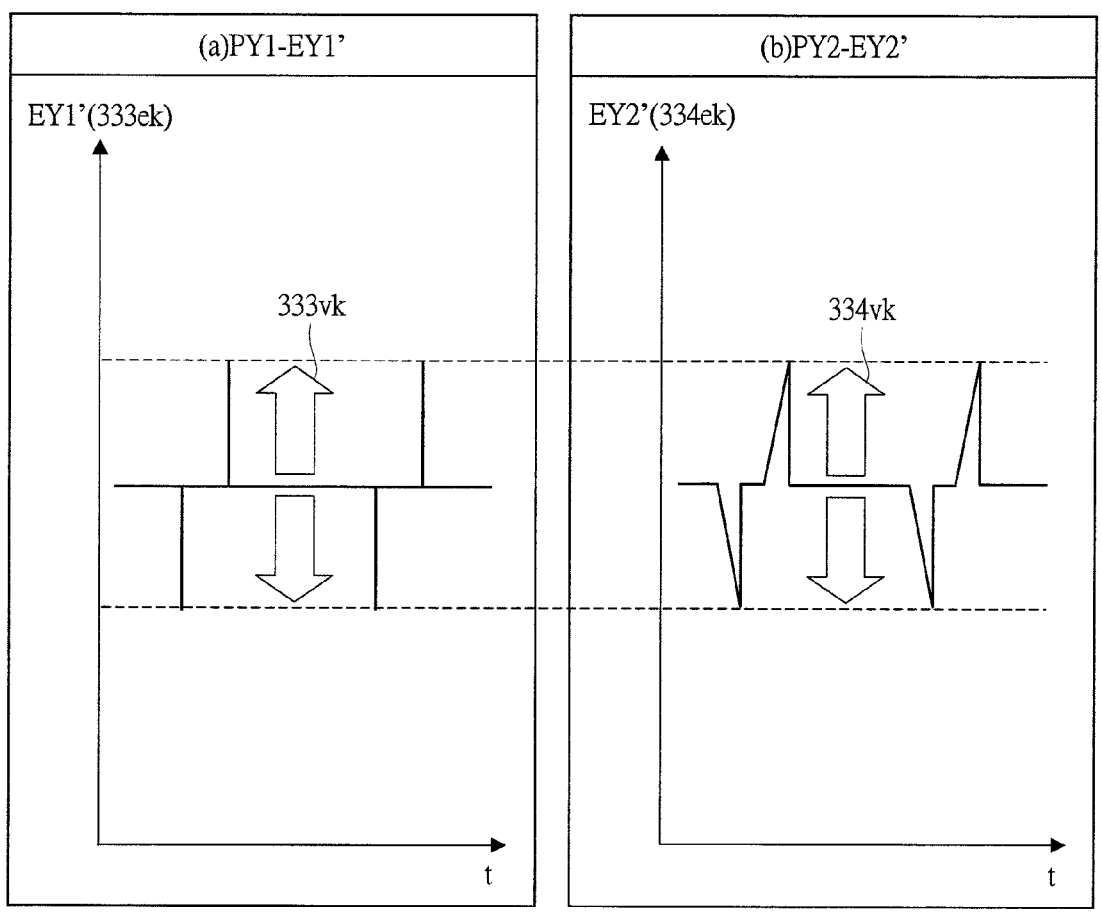
Figure 11:
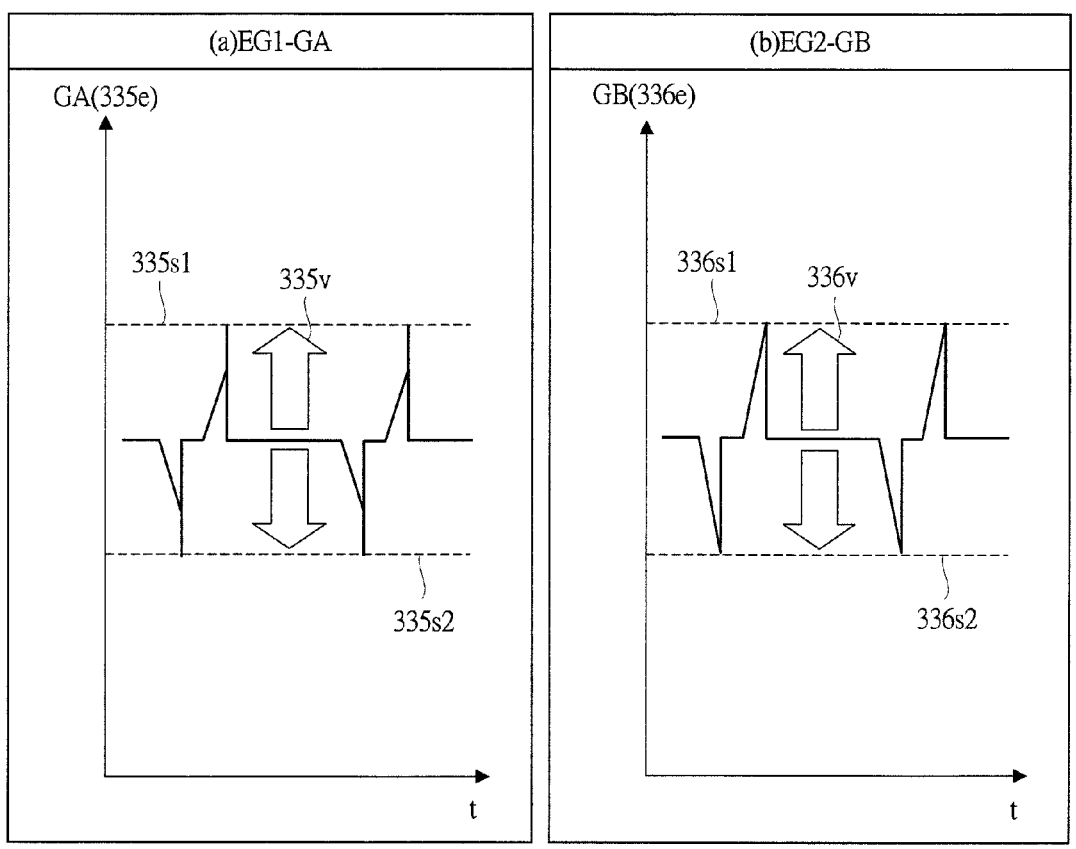
Figure 15:
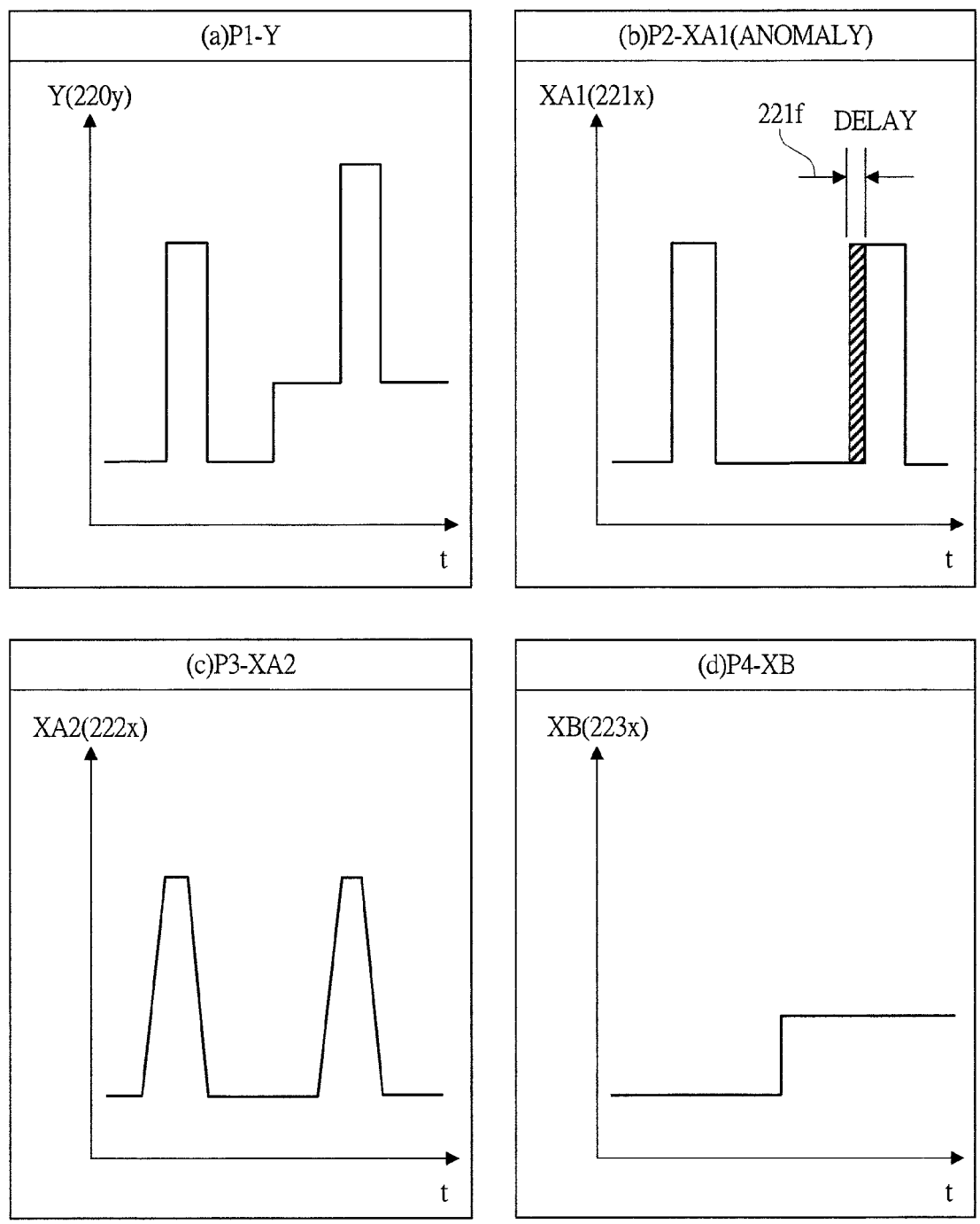
Figure 16:
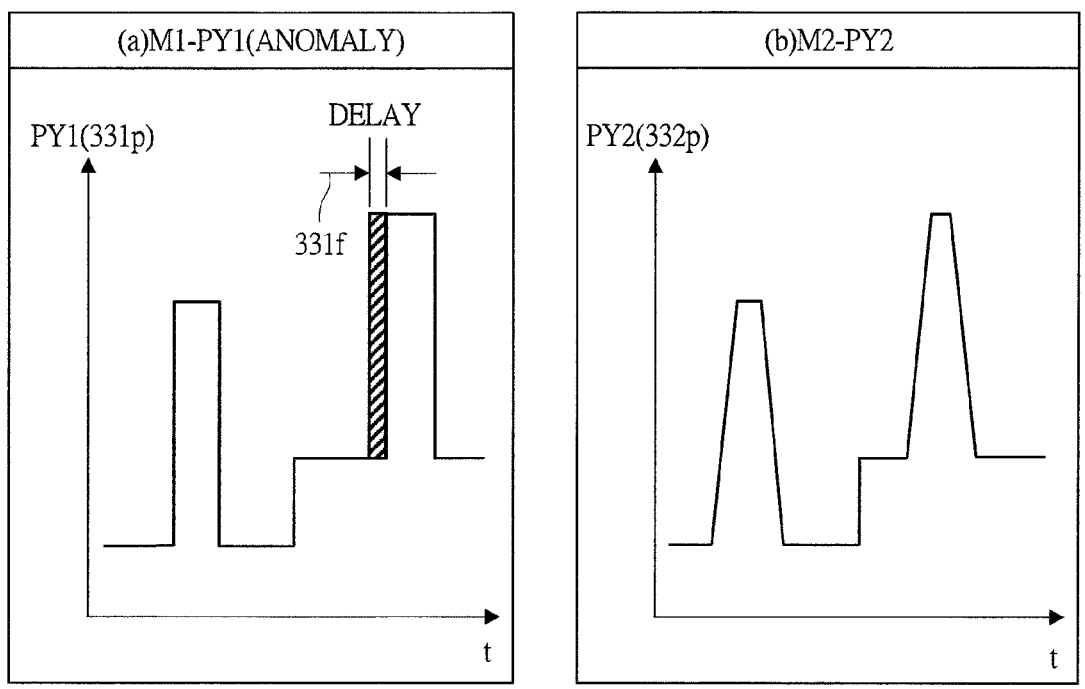
Figure 17:
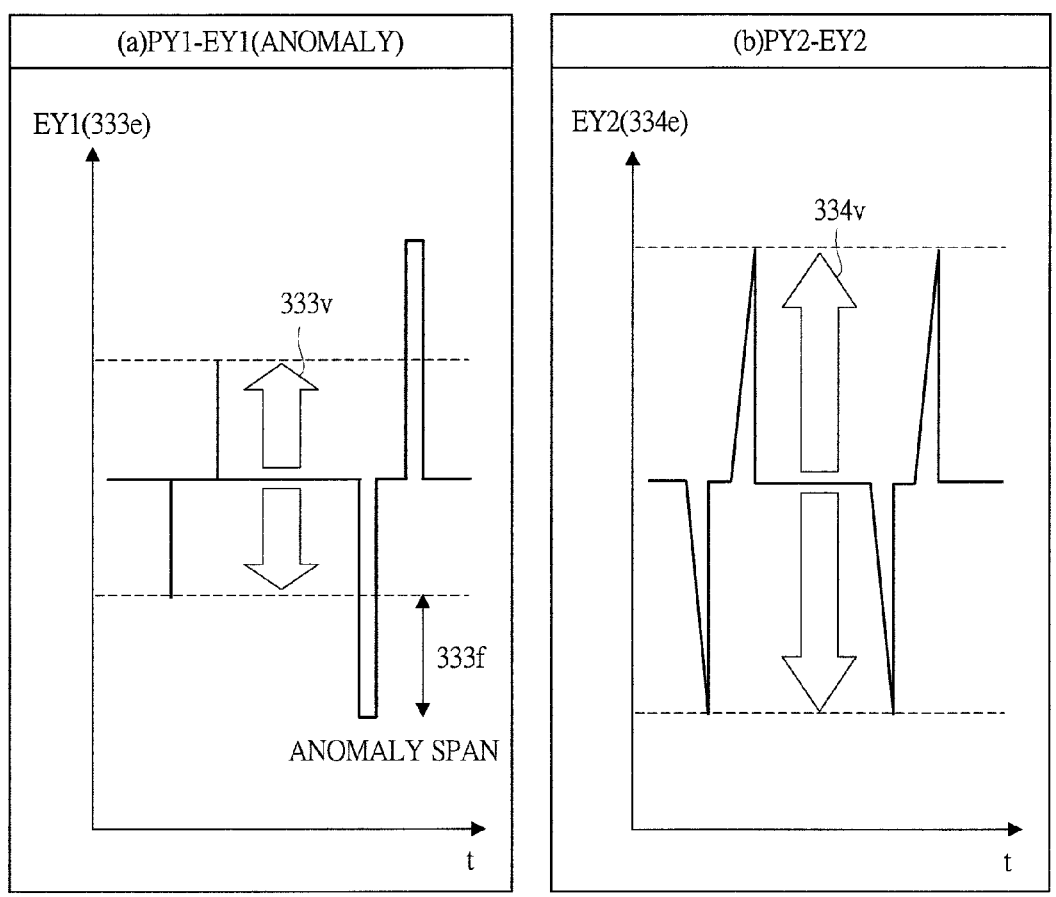
Figure 18:
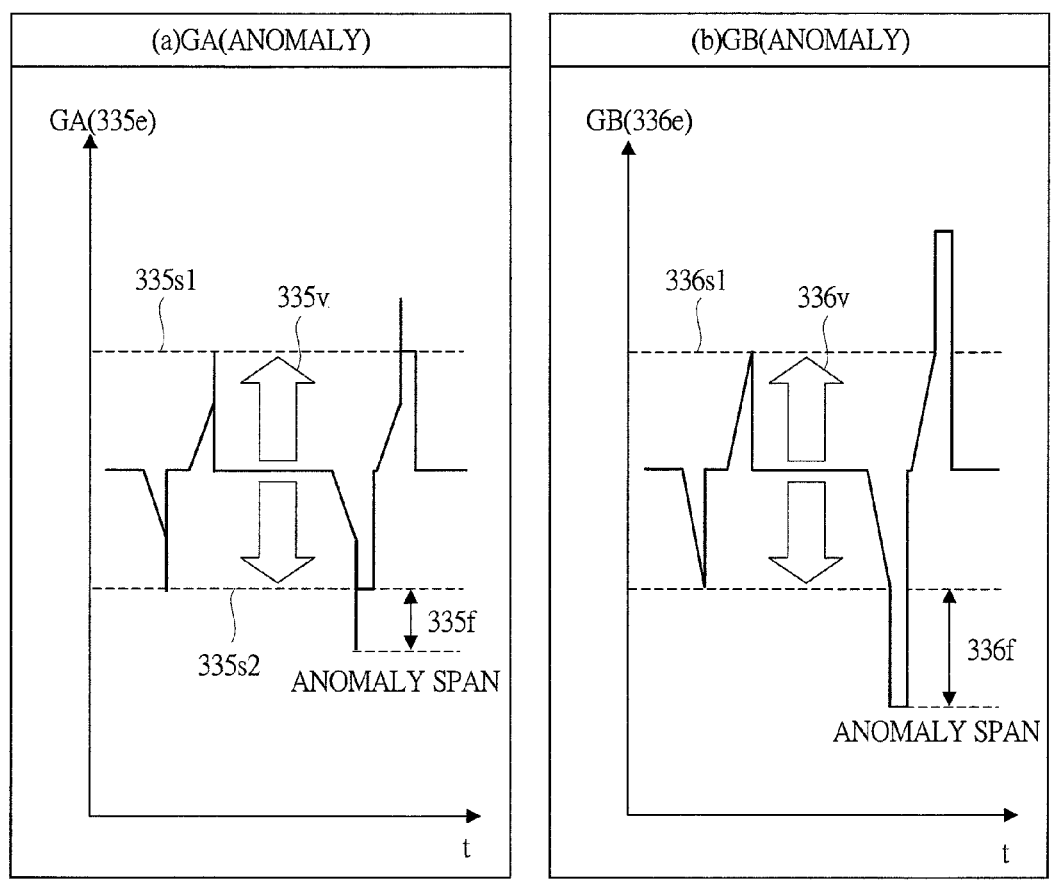
Figure 19:
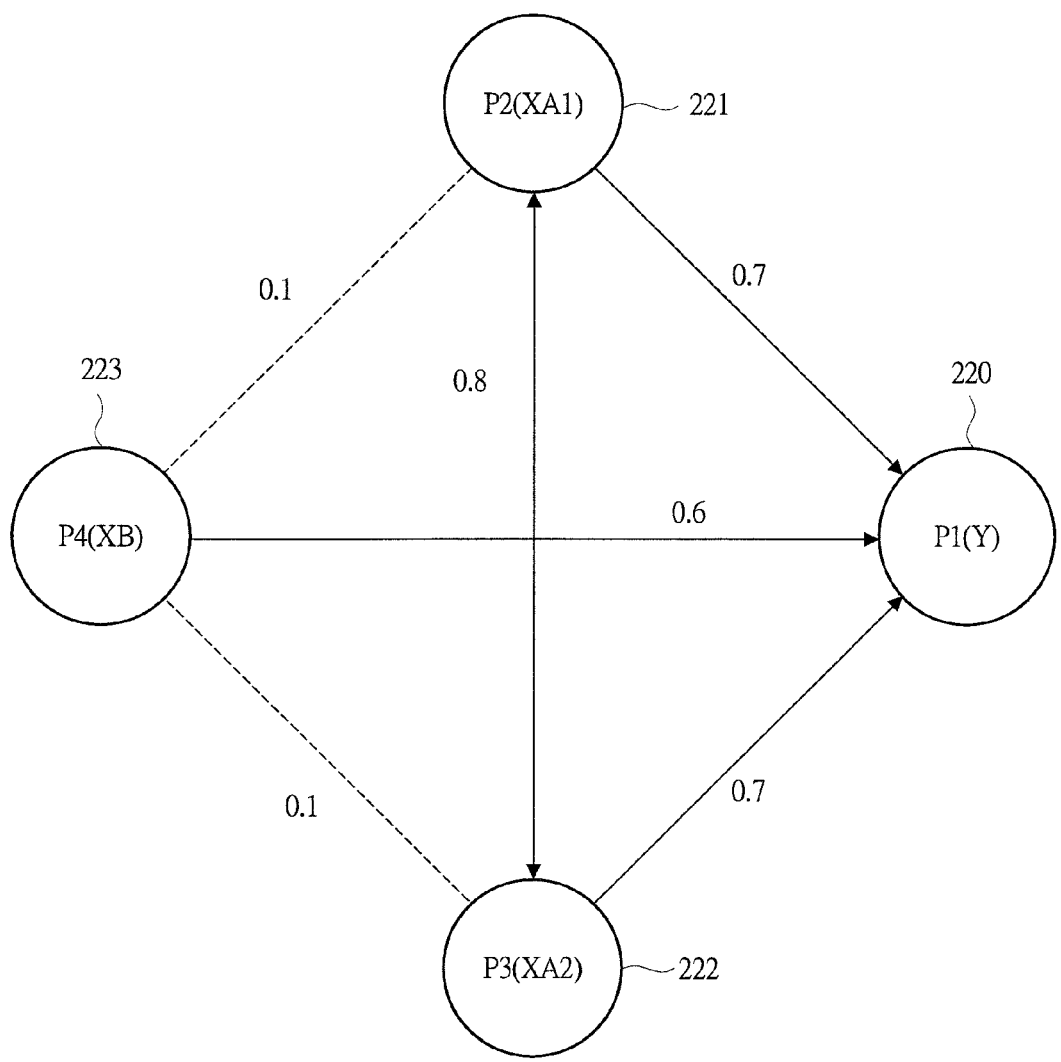
Figure 20:
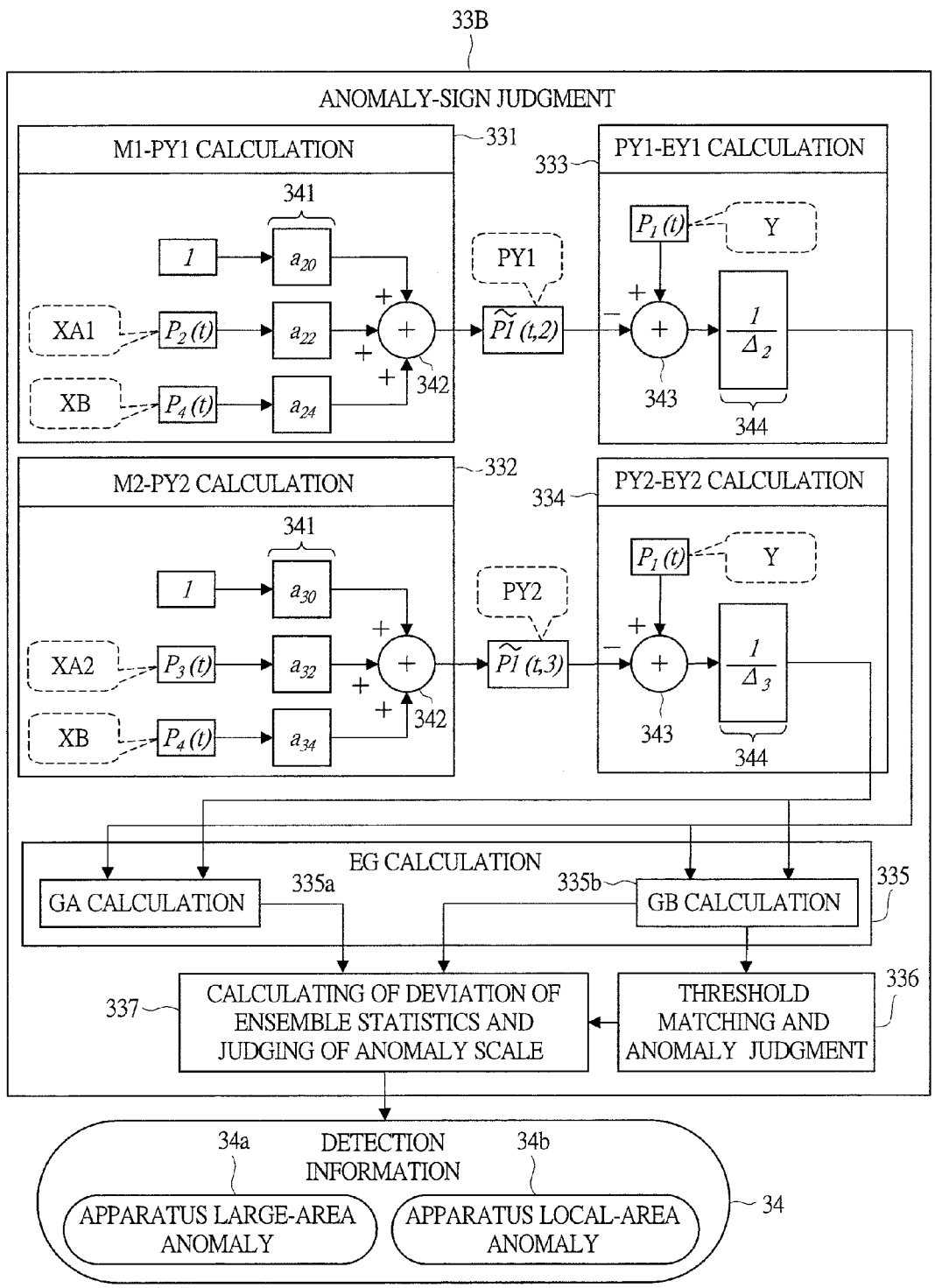
Figure 21:
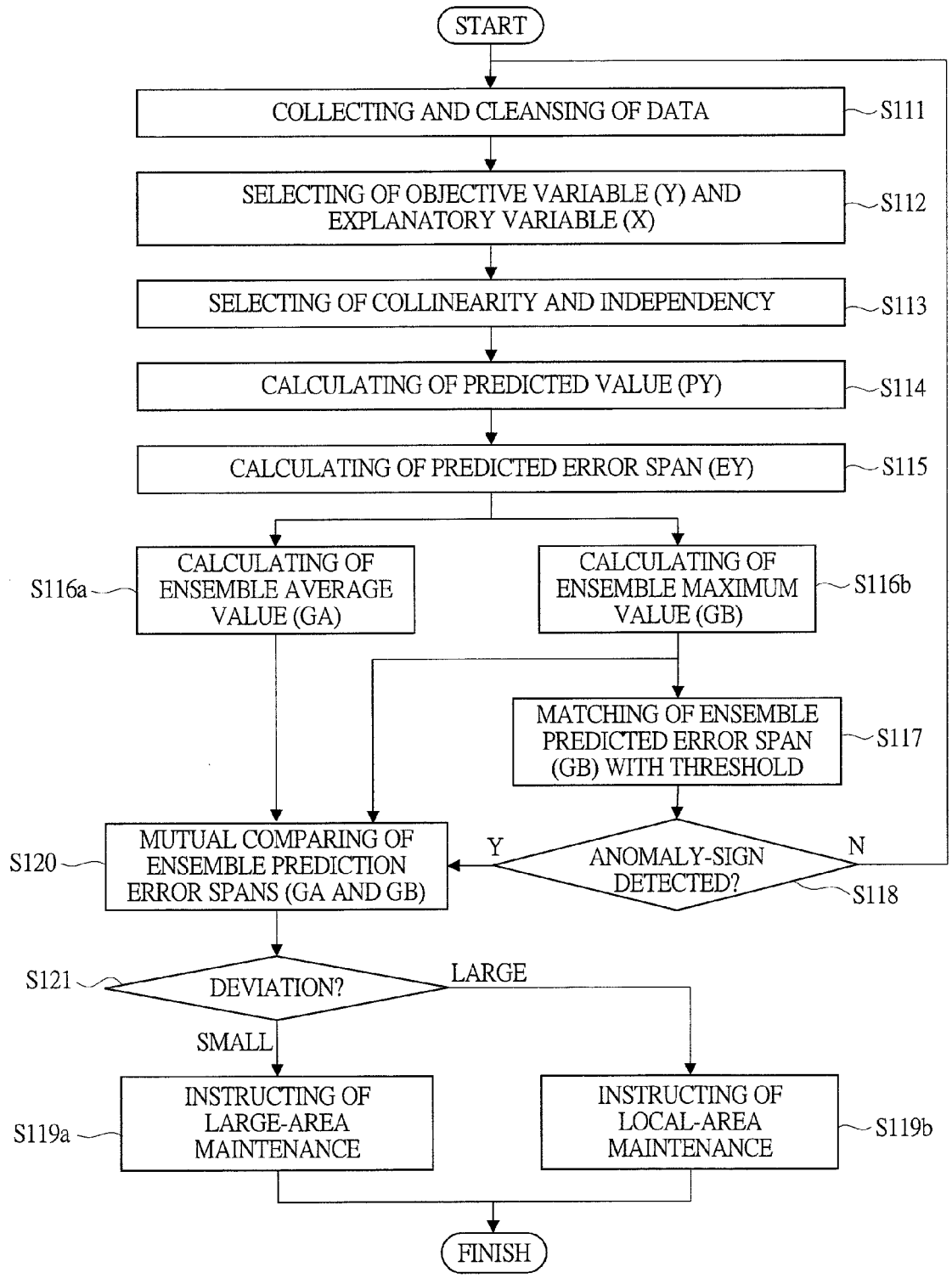
Figure 22:
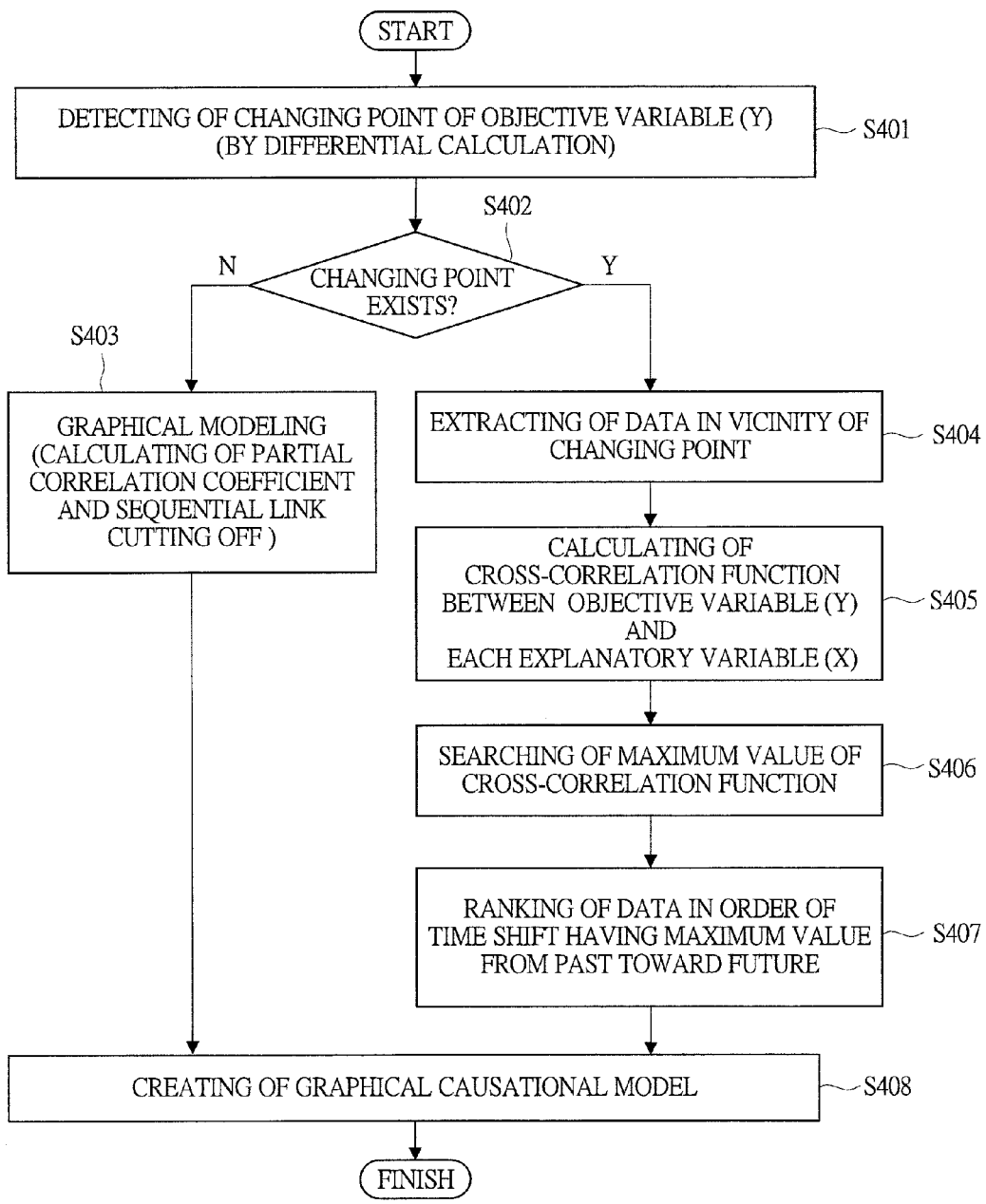
Figure 23:
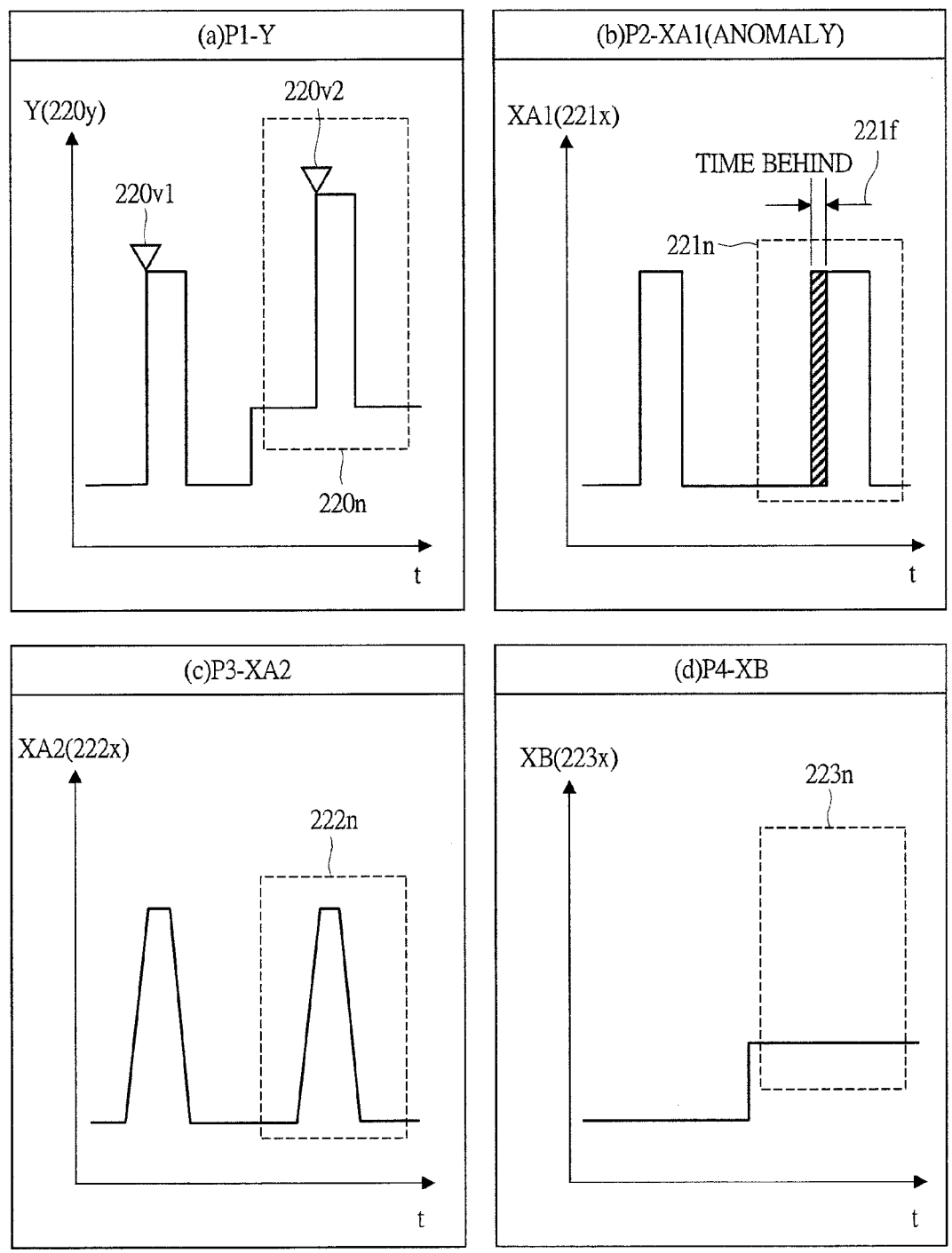
Figure 24:
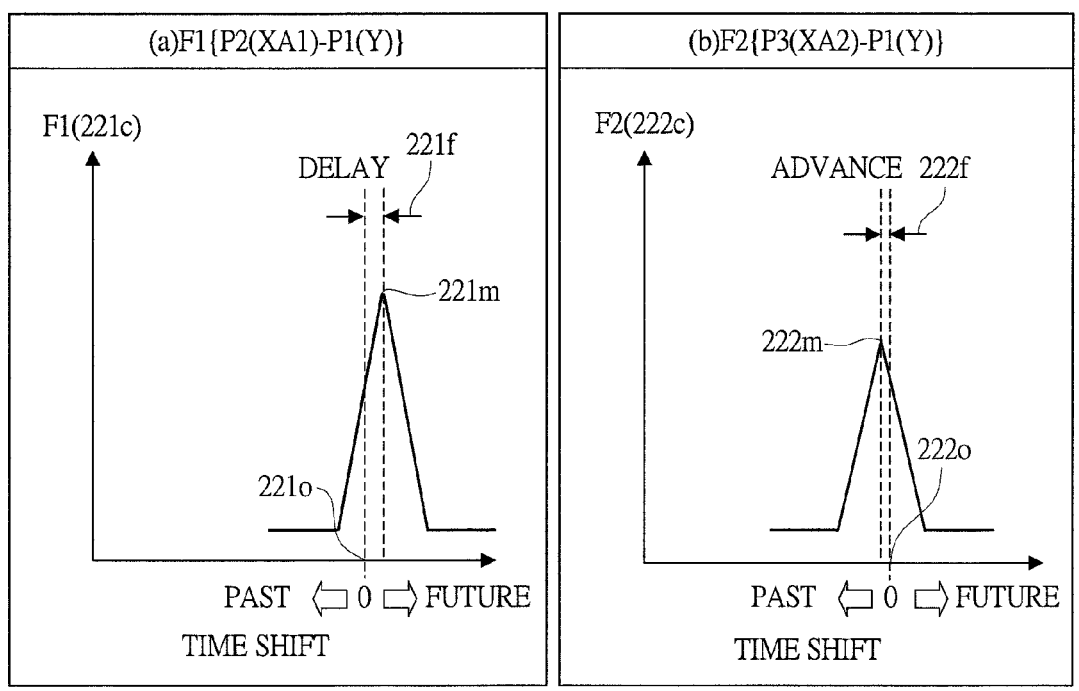
Figure 25:
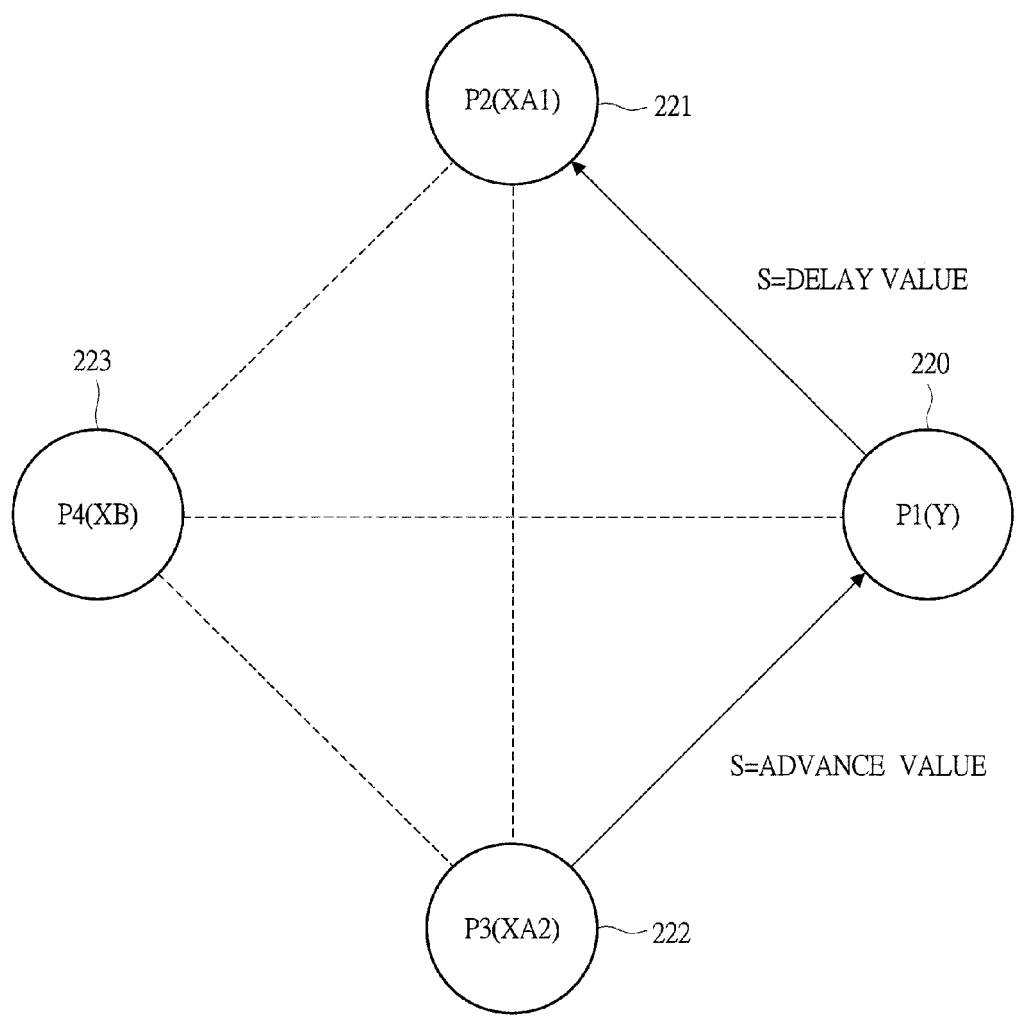
Figure 26:
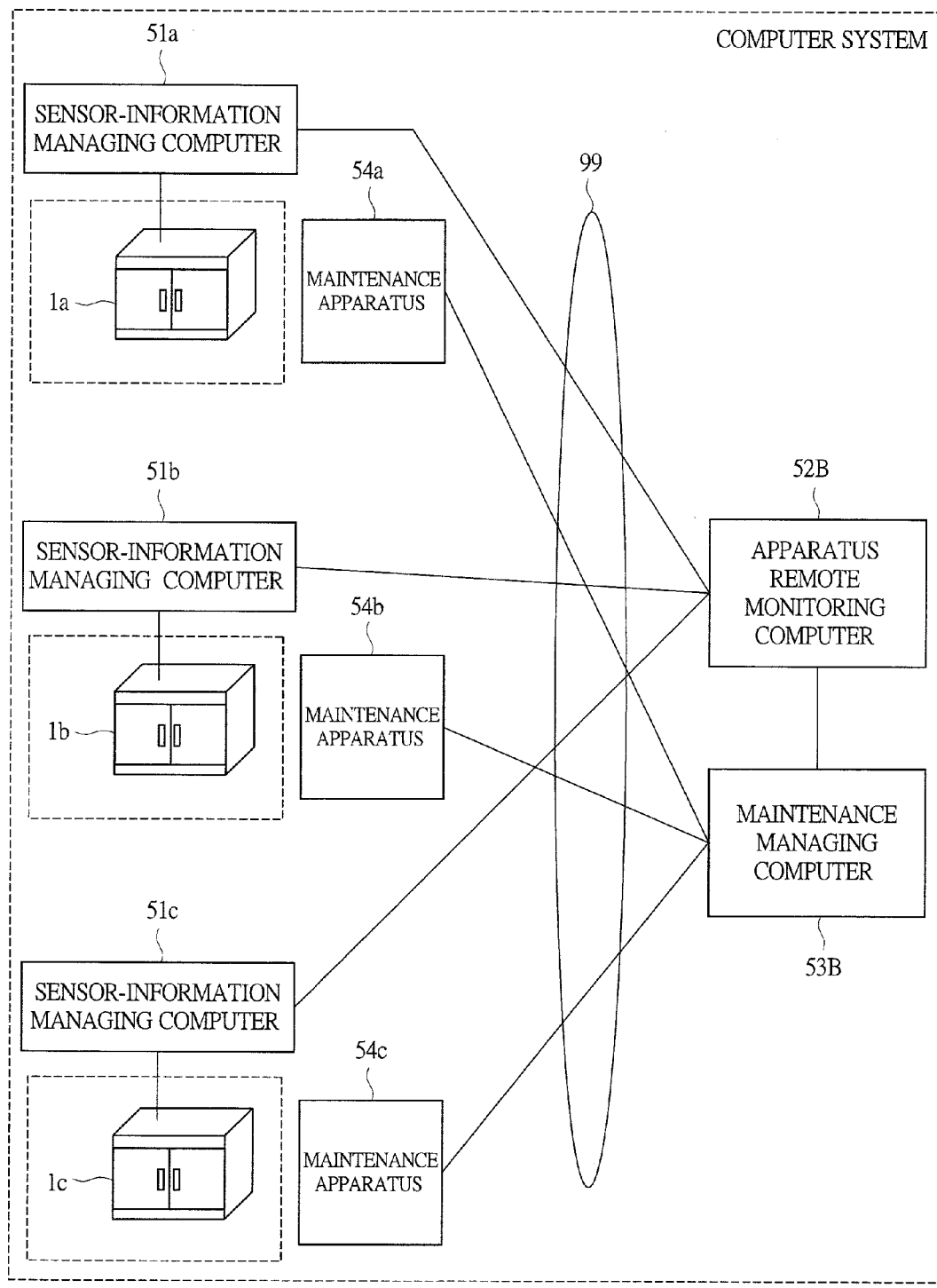

FIG. 7 ((a) to (d)) is a diagram showing transition of a category of an apparatus-state measurement data at a normal time with respect to apparatus operating time (t), a symbol (a) shows transition of an objective-variable data item (Y), a symbol (b) shows transition of a first collinearity explanatory-variable data item (XA1), a symbol (c) shows transition of a second collinearity explanatory-variable data item (XA2), and a symbol (d) shows transition of an independency explanatory-variable data item (XB);

FIG. 8 ((a) and (b)) is a diagram showing transition of a predicted value (PY) of the objective-variable data item (Y) with respect to apparatus operating time (t) based on two predictive models corresponding to the collinearity explanatory-variable data items (XA), a symbol (a) shows a first predicted value (PY1) based on a first predictive model (M1) with using the first collinearity explanatory variable (XA1), and a symbol (b) shows a second predicted value (PY2) based on a second predictive model (M2) with using the second collinearity explanatory variable (XA2);

FIG. 9 ((a) and (b)) is a diagram showing transition of a predicted error span (EY) of the predicted value (PY) of the objective-variable data item (Y) with respect to a measurement value (RY), with respect to the apparatus operating time (t), a symbol (a) shows a predicted error span (EY1) of the first predicted value (PY1), and a symbol (b) shows a predicted error span (EY2) of the second predicted value (PY2);

FIG. 10 ((a) and (b)) is a diagram showing transition of a predicted error span which is normalized (normalized predicted error span) with respect to the apparatus operating time (t), a symbol (a) shows a normalized predicted error span (EY1') of the first predicted value (PY1), and a symbol (b) shows a normalized predicted error span (EY2') of the second predicted value (PY2);

FIG. 11 ((a) and (b)) is a diagram showing transition of an ensemble predicted error span (EG) in combination with individual predicted error spans (EY) with respect to the apparatus operating time (t), a symbol (a) shows an ensemble average value (GA), and a symbol (b) shows an ensemble maximum value (GB);

FIG. 12 is a diagram showing a category (table) of data items of an apparatus-state measurement data;

FIG. 13 is a diagram showing a table of the predictive models;

FIG. 14 is a diagram showing an example of a cross-correlation matrix among data items;

FIG. 15 ((a) to (d)) is a diagram showing an example of transition of the apparatus-state measurement data with an anomaly sign, a symbol (a) shows transition of the objective variable, a symbol (b) shows transition of the first collinearity explanatory variable (with the anomaly sign), a symbol (c) shows transition of the second collinearity explanatory valuable, and a symbol (d) shows transition of the independency explanatory variable;

FIG. 16 ((a) and (b)) is a diagram showing an example of transition of the predicted value (PY) based on the data item with the anomaly sign, a symbol (a) shows the first predicted value (PY1) (with the anomaly sign) from the first predictive model (M1), and a symbol (b) shows the second predicted value (PY2) from the second predictive model (M2);

FIG. 17 ((a) and (b)) is a diagram showing an example of transition of the predicted error span (EY) based on the data item with an anomaly sign, a symbol (a) shows transition of the predicted error span (EY1) (with the anomaly sign) of the first predicted value (PY1), and a symbol (b) shows transition of the predicted error span (EY2) of the second predicted value (PY2);

FIG. 18 ((a) and (b)) is a diagram showing an example of transition of the ensemble predicted error span (EG) in combination of the predicted error spans (EY) based on the data item with the anomaly sign, a symbol (a) shows transition of the ensemble average value (GA) of the predicted error spans (EY1 and EY2) (with the anomaly sign) of the first predicted value (PY1), and a symbol (b) shows transition of the ensemble maximum value (GB) of the predicted error spans (EY1 and EY2) (with the anomaly sign);

FIG. 19 is a diagram showing a graphical causation model among the apparatus-state data items;

FIG. 20 is a diagram showing a detailed configuration of an anomaly-sign judgment module in an apparatus anomaly monitoring system according to a second embodiment of the present invention;

FIG. 21 is a diagram showing a process flow of the anomaly-sign judgment module according to the second embodiment;

FIG. 22 is a diagram showing a process flow for obtaining a causation model in an apparatus anomaly monitoring system according to a third embodiment of the present invention;

FIG. 23 ((a) to (d)) is a diagram showing an example of transition of the apparatus-state-measurement data item with the anomaly sign according to the third embodiment, a symbol (a) shows transition of an objective variable, a symbol (b) shows transition of a first collinearity explanatory variable, a symbol (c) shows transition of a second collinearity explanatory variable, and (d) shows transition of an independency explanatory variable;

FIG. 24 ((a) and (b)) is a diagram showing a computation result of a cross-correlation function according to the third embodiment, a symbol (a) shows a first cross-correlation function (F1) for the XA1-Y, and a symbol (b) shows a second cross-correlation function (F2) for the XA2-Y;

FIG. 25 is a diagram showing a graphical causation model among apparatus-state data items according to the third embodiment; and FIG. 26 is a diagram showing a configuration example of a computer system on which a system (remote apparatus maintenance system) according to a fifth embodiment is installed.

BEST MODE FOR CARRYING OUT THE INVENTION

Hereinafter, embodiments of the present invention (an apparatus anomaly monitoring method and a system) will be described in detail with reference to the accompanying drawings. Note that the same components are denoted by the same reference symbols in principle throughout the drawings for describing the embodiment, and the repetitive description thereof will be omitted. Note that the apparatus anomaly monitoring method and the system include not only monitoring and judging of an apparatus but also an apparatus maintenance method and a system for maintaining the apparatus based on these results.

<Outline>

First, an outline of the embodiments is as follows. In the embodiments, an output (state data item) from a plurality of sensors measuring a predetermined state of the apparatus is sampled and collected in a predetermined time unit, and is stored as a history. To each sensor, a predetermined state data item (for example, temperature, electricity, or others) is corresponded. By using the plurality of these state data items, each of means and its corresponding step as described below are processed.

(1) The method and system of the embodiments include first means and step of performing a process of creating a model as described below. In a predetermined time unit (an instructed timing, an instructed cycle, or others), by using a plurality of pieces of state data (histories) of an apparatus, a partial space model (apparatus-normal-state parameter partial space model) where the apparatus normal state is localized in a parameter space where each data item is plotted on an axis is created. More specifically, first, each of the data items is categorized into the objective variable (Y) and the explanatory variable (X) in the regression analysis (Y=A·X). As the objective variable (Y), for example, the output, the efficiency, or others of the apparatus may be set. Next, a plurality of explanatory variables (X) are categorized into a collinearity (collinearity-mode) data item (referred to as XA) and independency (independency-mode) data item (referred to as XB). The collinearity data item (collinearity explanatory-variable data item) (XA) is a data item with high cross-correlation (cross-correlation strength), and the independency data item (independency explanatory-variable data item) (XB) is a data item other than the collinearity data item (XA).

Next, for each collinearity explanatory-variable data item (XA), the explanatory variable (X) is set in combination of one collinearity data item (XA) and one or more independency data item (XB) to create the regression model between this explanatory variable (X: XA and XB) and the objective variable (Y). That is, an individual regression model (predictive model) is created at least as many as the number of (two or more) collinearity explanatory-variable data items (XA), and an ensemble of these regression models (ensemble regression model) can be created. By previously using the state data items in the apparatus normal state, the ensemble of regression models is created.

The embodiments have a feature that, by using the plurality of models (ensemble regression model) created for each of the collinearity explanatory-variable data items (XA), a specific computation regarding the ensemble regression model, such as a computation of an ensemble of the predicted error spans, is performed, and is used for monitoring, judgment, and others.

While a general-purpose linear multiple regression model is used as a standard for the regression models, the embodiments may use a method of selecting a non-linear model in accordance with the characteristics of the collinearity data item (XA) and mixing both of a linear model and the non-linear model. For one collinearity data item (XA), both of the linear model and the non-linear model may be simultaneously created and mixed. For flexibility of freely combining individual models, the usage of the ensemble model is one of advantageous points.

(2) The method and system of the embodiments have second means and step of performing a process of executing monitoring (anomaly detection) of the apparatus state as described below by using the created models (ensemble regression model) as a monitoring model. In this monitoring execution, in the predetermined time unit, a plurality of data items are collected by the plurality of sensors. And, for each of the collinearity data items (XA) in these data items, an explanatory variable (X) group in connection with one collinearity data item (XA) and one or more independency data items (XB) is created. With taking these groups as an input of the model, the objective variable (Y) is predicted, that is, a Y predicted value (PY) is outputted.

Next, a difference between an actually-measured objective variable value (Y measurement value: RY) contained in the data item collected by the monitoring and a predicted objective variable value (Y predicted value: PY) by the model is computed as an error span (predicted error span) (referred to as EY).

Next, a magnitude of the error span (EY) for each collinear data item (XA) is normalized to uniform a reference (to obtain a normalized error span (EY') group). As a coefficient for this normalization, an inverse of a magnitude of a normal shift of an error span at a normal time may be used. Alternatively, based on knowledge, experiences, and others for the data item of the apparatus, the normalization may be performed so that a degree of importance is determined for each data item as being superior or inferior. In this manner, the usage of the ensemble model in combination with individual models is an advantageous point in a point that the apparatus knowledge can be incorporated for each model corresponding to each data item.

Next, a distribution or an ensemble index of the plurality of normalized error spans (EY') obtained correspondingly to the number of collinearity data items (XA) is computed. That is, based on the error span (EY) and the normalized error span (EY') of the Y predicted value (PY) for each collinearity data item (XA), an ensemble predicted error span (referred to as EG) is computed. More specifically, as an example of the EG, an ensemble average value (referred to as GA) is computed. In this case, a large-scaled apparatus anomaly sign (large-area anomaly) related to the plurality of data items of the apparatus can be detected. Also, as another example of the EG, an ensemble maximum value (referred to as GB) is computed. In this case, an apparatus anomaly sign (local anomaly) caused in an arbitrary single data item of the apparatus can be detected with high accuracy.

Further, a difference between the GA and the GB may be used. In this case, the difference can be used as an index for determining either the local anomaly or the large-area anomaly. Still further, instead of the GB, a statistical quantile of a distribution of an ensemble individual error span (EY group) may be used. Note that a statistical q quantile means a value dividing the distribution of the ensemble individual error span (EY group) into "q: (1−q)". Still further, instead of the GA, an effective value obtained by root mean square of the ensemble individual error span (EY group) may be used.

As described above, an ensemble of error spans (EY) (ensemble predicted error span: EG) between the predicted value (PY) and the measurement value (RY) for covering all data items of the plurality of state data items of the apparatus is computed. Based on the distribution of the EG or the ensemble index in combination with the individual predicted error spans (EY), the anomaly is detected. Also, before computing the EG, for each data item, by normalizing the individual error spans (EY) to which the design knowledge of the apparatus and the knowledge and experiences based on failure cases are fed back, accuracy of the anomaly detection is improved.

(3) The method and system of the embodiments have third means and step of performing a process of anomaly diagnosis as described below by using a result of the monitoring (anomaly detection). After detecting the apparatus anomaly sign, by ranking each of the normalized error spans (EY') at the time of detecting the anomaly sign (at sampling time) in a descending order, priorities of the degree of importance are set for the anomaly-detected data items, and this information is outputted as a candidate of anomaly occurrence cause phenomenon (anomaly candidate information).

Since a module, part, or others at a predetermined location of the apparatus is associated with each data item, the anomaly candidate information can be outputted in a form of anomaly-part candidate information or others. In this process, for example, by using an apparatus design data (containing information about modules, parts, and others configuring the apparatus), the module, the part, and others associated with the anomaly-detected data item are specified and extracted, and they are set as a candidate of the anomaly occurrence cause phenomenon. By transmitting the anomaly part candidate information to, for example, a maintenance apparatus for maintenance operation, the maintenance operation is helped.

Also, by collecting the apparatus data (state-data items) after detecting the anomaly sign and performing the causation analysis with using the graphical modeling described in Patent Document 3 and Non-Patent Document 4 above, accuracy of specifying the candidate (the state-data item, the part, or others) of the anomaly cause phenomenon can be improved. More specifically, in the graphical modeling, by computing not only the cross-correlation coefficient but also a partial correlation coefficient in a graph network, virtual correlation caused by a confounding variable is found and eliminated, so that the cause is specified.

Further, when a clear changing point exists in the objective variable (Y) on the time axis, by examining an order of the change occurrence in each explanatory variable data items (X) around the changing point, the causation analysis for specifying a cause of an initial occurrence of the change can be performed. More specifically, by computing a differential value of the data (state-data item) with respect to the sampling time, the changing point is found, and besides, the order of the changing points is determined. Alternatively, a cross-correlation function between the objective variable (Y) and each explanatory variable (X) may be computed. The cross-correlation function is a scale to measure how much degree each explanatory variable (X) matches a signal obtained by time-shifting the objective variable (Y), and is expressed by a function of a magnitude of the time shift. A change amount of a maximum value where the cross-correlation function is maximized is examined around the changing point of the objective variable (Y) on the time axis, so that it can be found whether the changing point of the explanatory variable (X) corresponding to the changing point of the objective variable (Y) exists or not. Also, a time-shift amount by which the cross-correlation function is maximized is examined around the changing point on the time axis, so that it can be found either the changing point of the explanatory variable (X) is in past or future of the changing point of the objective variable (Y) from either a value of the time shift amount is plus or minus, and it can be found how far the changing point of the explanatory variable (X) is away from the changing point of the objective variable (Y) from a magnitude of the time shift amount. By examining the presence or absence of the changing point and the time shift amount for each explanatory variable (X), an order of the causation with respect to the changing point of the objective variable (Y) can be found.

(4) The method and system of the embodiments have fourth means and step of performing processes of computing a part lifetime or others as described below by using a result of the anomaly diagnosis and performing a maintenance plan (maintenance operation instruction). When a part or others associated with the location which is the candidate of the anomaly cause phenomenon can be specified by the anomaly diagnosis, the lifetime of the part or others is computed. For this computation, for example, a proportional hazard model previously created from the history of the data items and described in the above-described Non-Patent Document 5 is used. And, based on the computed lifetime, information about the maintenance plan including a time schedule such as a preparation plan, operation plan, and execution plan of maintenance-target modules and parts of the apparatus is created, and the maintenance plan is executed. For example, the information about the maintenance plan is transmitted to a maintenance apparatus used by a maintenance operator, and is displayed thereon.

First Embodiment

With reference to FIGS. 1 to 6, 7 to 14, 15 to 18, and 19, and others, the apparatus anomaly monitoring method and its system according to a first embodiment of the present invention are described. In the first embodiment, processes from creating the model to the monitoring and judgment are performed. Note that, as a configuration shown in FIG. 1 and others, components described in not only the first embodiment but also a second embodiment and subsequent ones are collectively shown.

<System (1)>

Figure 1:
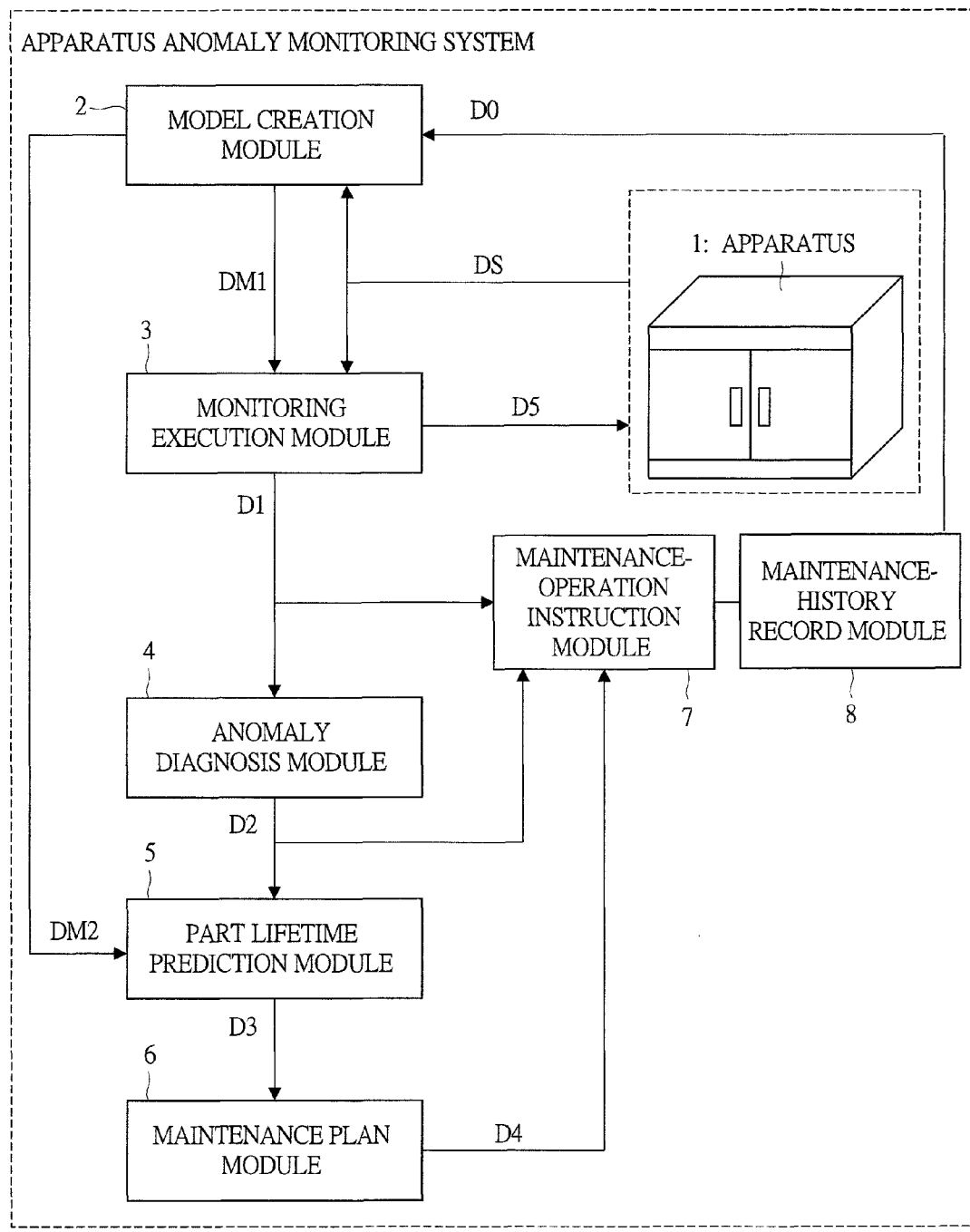
FIG. 1 is a diagram showing a configuration of main units of a system (apparatus anomaly monitoring system) for achieving an apparatus anomaly monitoring method according to an embodiment of the present invention.
Figure 2:
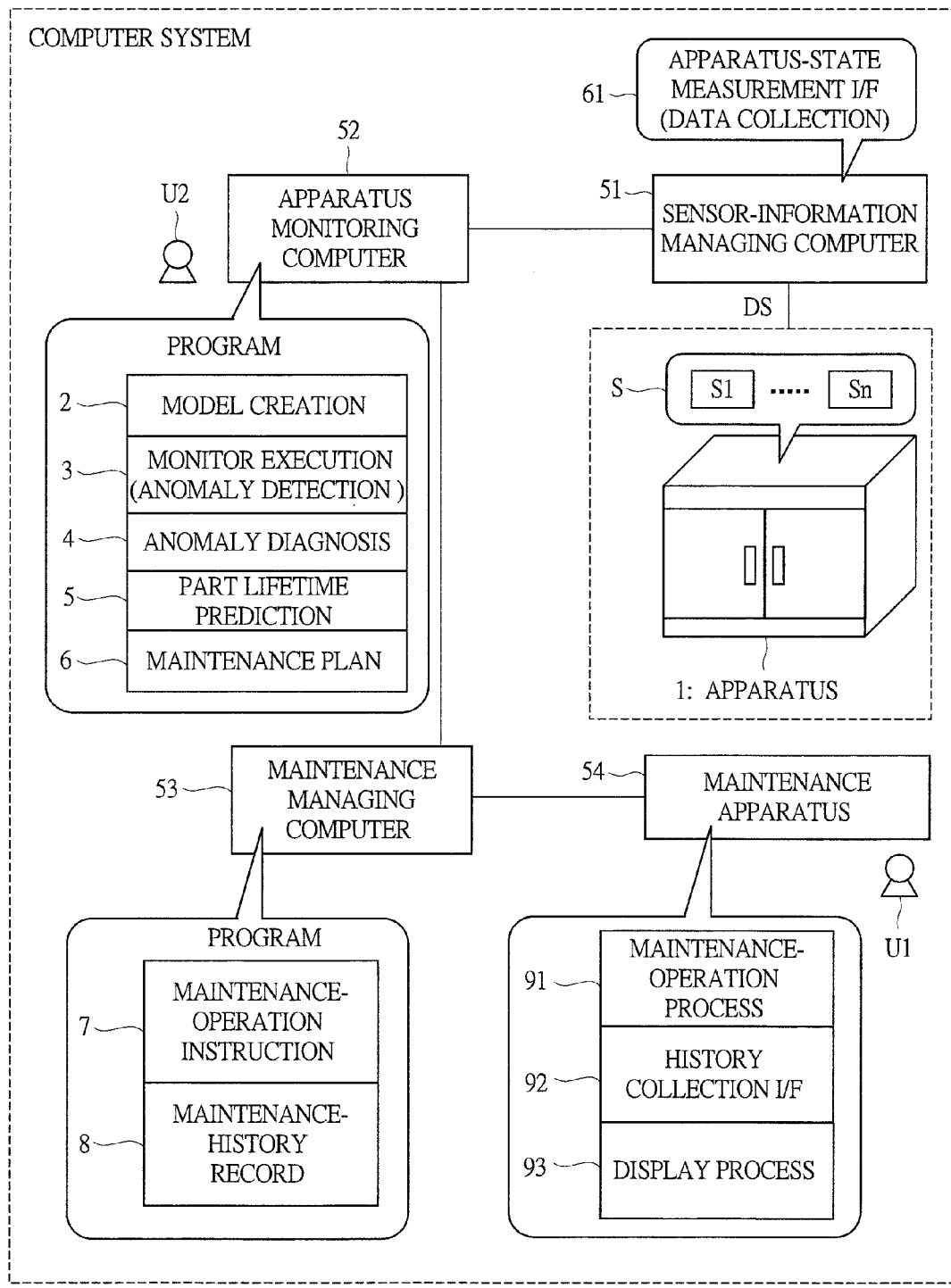
FIG. 2 is a diagram showing a configuration example of a computer system on which the apparatus anomaly monitoring system is installed.

FIG. 1 shows a configuration of main units of a system (apparatus anomaly monitoring system) for achieving an apparatus anomaly monitoring method of the first embodiment. For an apparatus (facility) 1 to be a target of the monitoring and others, the system has a configuration including: a model creation module 2; a monitoring execution module 3 (in other words, an anomaly detection module); an anomaly diagnosis module 4 (in other words, an anomalous part presumption module); a part lifetime estimation module 5; a maintenance plan module 6; a maintenance operation instruction module 7; and a maintenance history record module 8. Each module and sub-module (processing unit) is achieved by information processing of a general computer by using predetermined hardware and software. A configuration as a computer system is shown in FIG. 2.

The target apparatus 1 is, for example, an energy converting apparatus (a cogeneration apparatus, an electrical apparatus, a motor apparatus, a thermal source apparatus, or others) of converting fuel to at least kinetic energy, thermal energy, or electrical energy. Note that the apparatus 1 may be a system configured by a plurality of apparatuses or others. A plurality of sensors measuring a state of a predetermined region or type are embedded in the apparatus 1 or provided in vicinity of an outside of the apparatus 1 (as S in FIG. 2). Each of the plurality of sensors outputs a corresponding sensor data (state measurement data) DS.

The model creation module 2 performs a process of creating and updating the model for the monitoring or others by using the sensor data DS from the apparatus 1, a maintenance history data D0, or others. The model includes: a monitoring model (predictive model) DM1; and a lifetime predictive model DM2.

The monitoring execution module 3 performs a process of monitoring (anomaly-detecting) the apparatus 1 by using the sensor data DS from the apparatus 1 or the monitoring model data DM1 from the model creation module 2. As a result, when the anomaly (anomaly sign) of the apparatus 1 is detected, the monitoring execution module 3 outputs detection information D1 indicating the detection. Also, for example, the monitoring execution module 3 outputs a stop signal D5 to the apparatus 1 as required, so that the operation of the apparatus 1 can be stopped.

By using the detection information D1 outputted by the monitoring of the monitoring execution module 3, the anomaly diagnosis module 4 performs a process of the anomaly diagnosis, more particularly, the anomalous part estimation. As a result, the anomaly diagnosis module 4 outputs anomalous part information (candidate information) D2 or others. Also, for example, the anomaly diagnosis module 4 directly outputs the anomalous part information (candidate information) D2 to the maintenance operation instruction module.

The part lifetime prediction module 5 performs a process of predictive computation of the lifetime of the part by using the data of the lifetime predictive model DM2 from the model creation module 2 and the result (the anomalous part information D2) from the anomaly diagnosis module 4, and, as a result, outputs anomalous-part lifetime information D3.

The maintenance plan module 6 performs a process of the maintenance plan by using the result (the anomalous-part lifetime information D3) from the part lifetime prediction module 5, and outputs maintenance plan information D4.

The maintenance operation instruction module 7 performs a process of instructing the maintenance operation based on the direct detection information D1 from the monitoring execution module 3, the maintenance plan information D4 from the maintenance plan module 6, and others. The instruction for the maintenance operation includes outputting the information for instructing the maintenance operation to a used maintenance apparatus (54 in FIG. 2) by a maintenance operator (U1 in FIG. 2). The maintenance operator (U1) follows this instruction to perform the maintenance operation for the apparatus 1, such as replacing a part of a predetermined module.

The maintenance history record module 8 performs a process of recording the result of the maintenance operation as a history data to provide this maintenance history data D0 to an outside as required. For example, to the maintenance history record module 8, the information of the result (content) of the maintenance operation is inputted from the apparatus 1 or the maintenance apparatus (54).

<System (2)>

FIG. 2 shows a configuration example of a computer system on which the system of FIG. 1 is installed. In the computer system, a component such as each module of FIG. 1 is achieved in a form of a program mainly operated by a computer. A correspondence between each module and each computer is as shown in FIG. 2. Each computer includes a processor, a memory, a communication interface, an input/output apparatus, and others, which are not shown. A connection between computers is, for example, via a dedicated line or a communication network.

The computer system includes: a sensor information managing computer 51; an apparatus monitoring computer 52; a maintenance managing computer 53; and the maintenance apparatus (maintenance operation terminal) 54. The maintenance apparatus 54 is used by, for example, the maintenance operator (U1).

The sensor information managing computer 51 is connected to the plurality of (n) sensors S (S1 to Sn) of the apparatus 1, and includes a function of an apparatus state measurement I/F 61 for sampling and collecting the data (DS) as an interface (I/F) of the state measurement data DS of the apparatus 1 through the plurality of sensors S.

The apparatus monitoring computer 52 is connected to the sensor information managing computer 51 and the maintenance managing computer 53, and achieves the model creation module 2, the monitoring execution module 3, the anomaly diagnosis module 4, the part lifetime prediction module 5, and the maintenance plan module 6 by processing of programs. For example, in the apparatus monitoring computer 52, the processor executes the programs and the data on the memory, so that the process functions of the model creation module 2 or others is achieved.

The maintenance managing computer 53 is connected to the apparatus monitoring computer 52 and the maintenance apparatus 54, and achieves the maintenance operation instruction module 7 and the maintenance history record module 8 by processing of programs.

The maintenance apparatus 54 achieves the functions of a maintenance operation process 91, a history collecting I/F 92, a display process 93, and others by processing of programs. The maintenance operation process 91 includes, for example, a process of storing the maintenance history data D0 through a maintenance operation data input by the maintenance operator (U1). The display process 93 is a process of, for example, displaying the information of the maintenance operation instruction from the maintenance operation instruction module 7 on a screen of a display apparatus in accordance with the information. The function of the history collecting I/F 92 is a process of collecting the maintenance history data D0.

A system administrator (U2) performs an operation of managing and setting the system to the computer in the system such as setting a used method or the objective variable (Y). A necessary numerical value or information such as each threshold is previously set in the system or is appropriately set by the system administrator (U2) or others.

<Model Creation Module>

Figure 3:
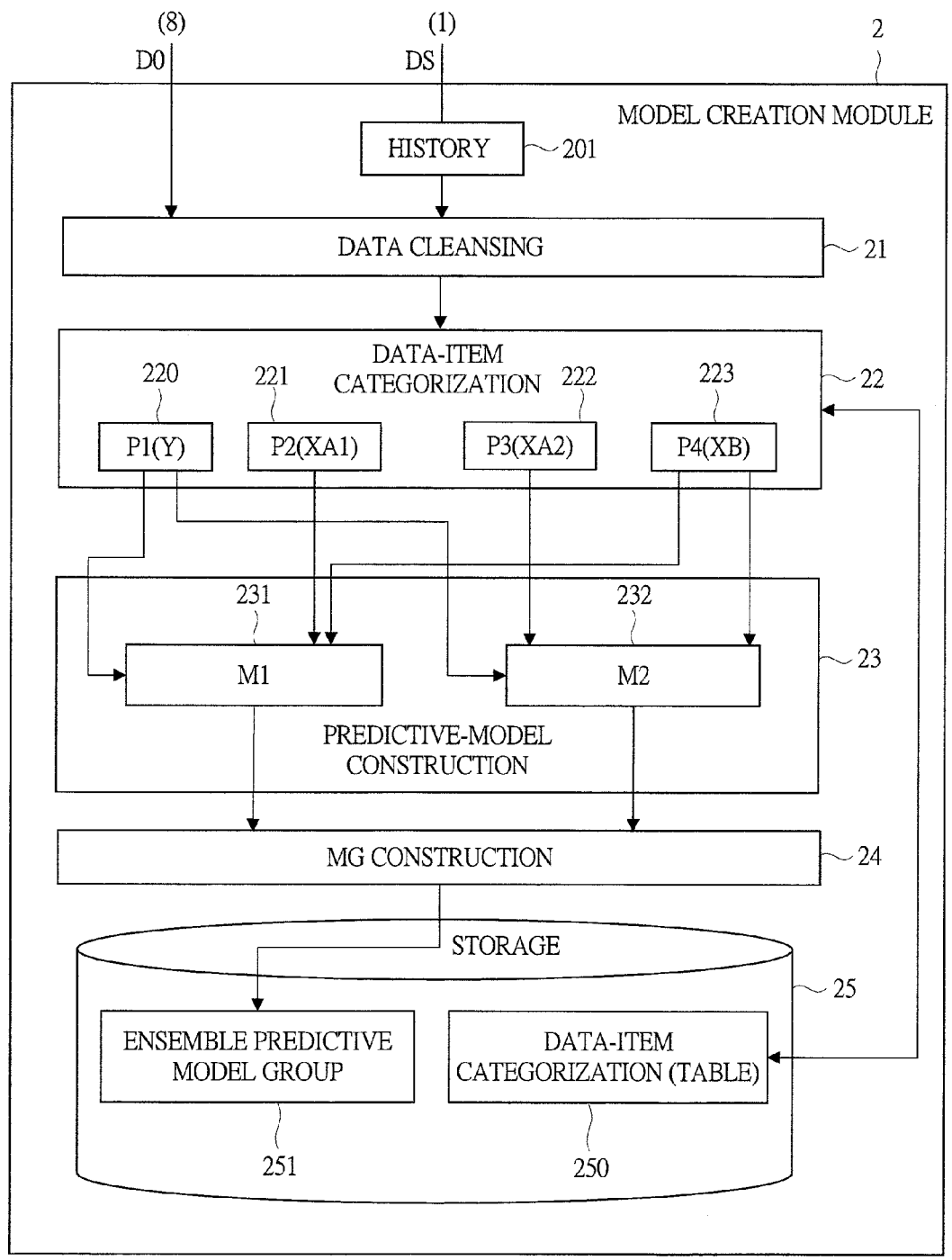
FIG. 3 is a diagram showing a detailed configuration of a model creation module in the apparatus anomaly monitoring system.

FIG. 3 shows a detailed configuration of the model creation module 2. As each sub-module (processing unit), the model creation module 2 includes: data cleansing 21; data item categorization 22; predictive model construction 23; ensemble predicted error span computation model construction 24; storage 25; and others.

The model creation module 2 receives an input of the state measurement data DS from the plurality of sensors S of the apparatus 1, and stores the input in storage means as the history (history 201). This storage means uses, for example, the sub-module of the storage 25.

The state measurement data DS (history 201) is cleansed by the data cleansing 21 based on the maintenance history data (D0), and is categorized into various data items in the data item categorization 22. In this example, categories of the state-measurement data items includes: an objective-variable data item (Y) 220; a first collinearity explanatory-variable data item (XA1) 221; a second collinearity explanatory-variable data item (XA2) 222; and an independency explanatory-variable data item (XB) 223. This data item category 250 is stored in the sub-module of the storage 25.

Based on the data item categorization 22, in the predictive model construction 23, a plurality of predictive models created for each collinearity explanatory-variable data item (XA) are constructed. In this example, the predictive model includes: a first predictive model (M1); and a second predictive model (M2), which correspond to two collinearity explanatory-variable data items (XA1 and XA2). The first predictive model (M1) is constructed by using the objective-variable data item (Y) 220, the first collinearity explanatory-variable data item (XA1) 221, and the independency explanatory-variable data item (XB) 223. The second predictive model (M2) is constructed by using the objective-variable data item (Y) 220, the second collinearity explanatory-variable data item (XA2) 222, and the independency explanatory-variable data item (XB) 223. The data of these predictive models is stored in the sub-module of the storage 25.

In the ensemble predicted error span computation model construction 24, by using the constructed predictive models (M1 and M2), an ensemble predictive model group 251 (including an ensemble predicted error span computation model MG) is constructed, and is stored in the sub-module of the storage 25. The constructed model is used as a monitoring model (DM1) or others.

Note that the objective variable (Y) 220 as a prediction target is specified (set) by the system administrator (U2) or others, or is determined by automatic computation by a computer. For an example of setting the objective variable (Y), for example, power ([W]) is used as an output of the apparatus 1.

<Monitoring Execution Module>

Figure 4:
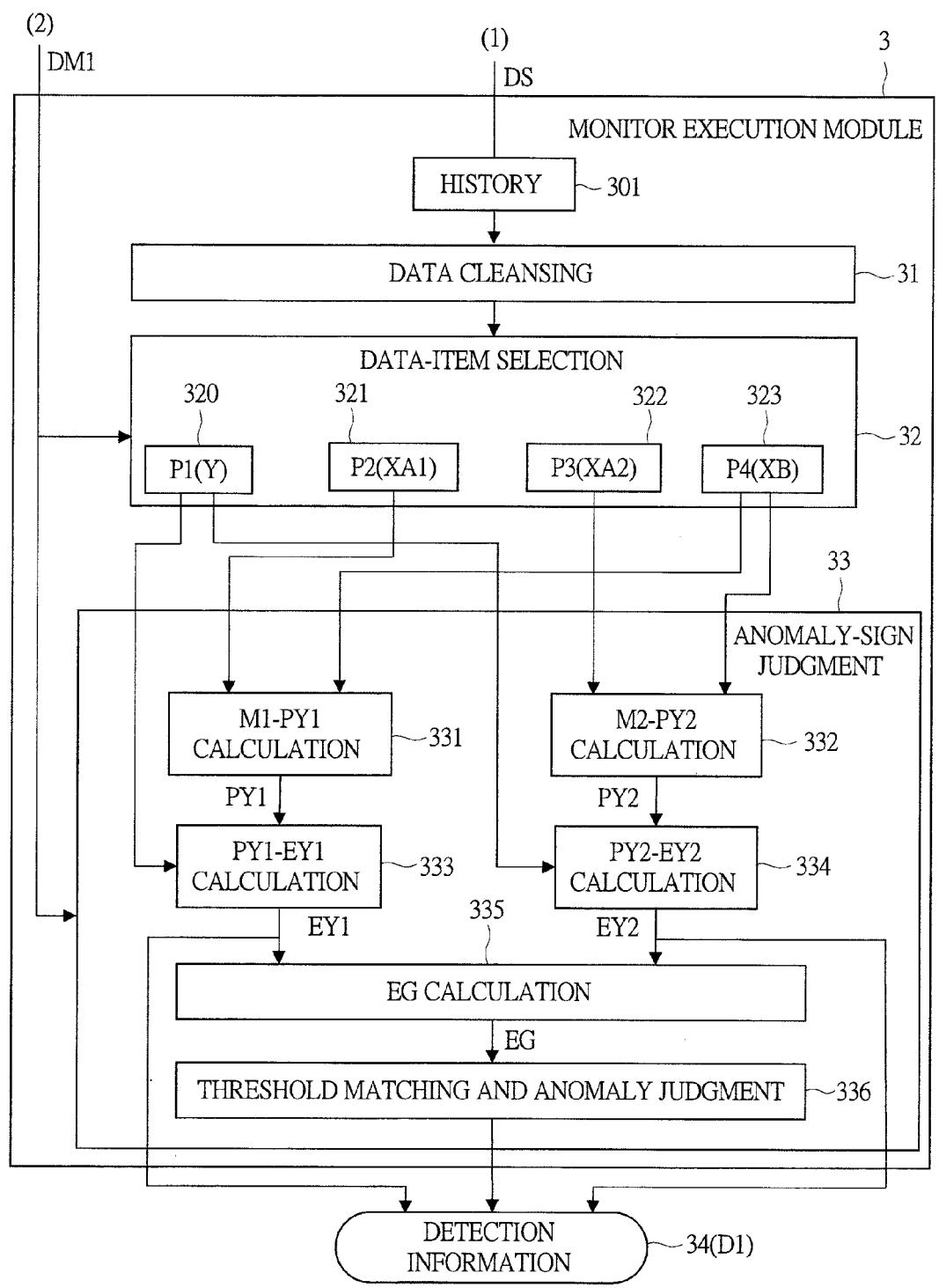
FIG. 4 is a diagram showing a detailed configuration of a monitoring execution module in the apparatus anomaly monitoring system.

FIG. 4 shows a detailed configuration of the monitoring execution module 3. As each sub-module, the monitoring execution module 3 includes: data cleansing 31; data item selection (apparatus-state monitoring parameter selection) 32; and anomaly sign judgment 33. In the data item selection 32 and the anomaly sign judgment 33, the data of the monitoring model (DM1) from the model creation module 2 is used.

The monitoring execution module 3 stores the data (DS) from the plurality of sensors S of the apparatus 1 in storage means as a history 301. In the data cleansing 31, the state measurement data DS (history 301) is cleansed. In the data item selection 32, the data item is selected based on the data of the monitoring model (DM1) from the model creation module 2. The data item includes: an objective-variable data item (Y) 320; a first collinearity explanatory-variable data item (XA1) 321; a second collinearity explanatory-variable data item (XA2) 322; and an independency explanatory-variable data item (XB) 323.

The anomaly sign judgment 33 includes: a first predictive-model predicted value computation 331; a second predictive-model predicted value computation 332; a first predicted-value error span computation 333; a second predicted value error span computation 334; an ensemble predicted error span computation 335; and threshold matching/anomaly judgment 336.

In the first predictive-model predicted value computation 331, from XA1 (321) and XB (323), a first predicted value (PY1) is computed based on the first predictive model (M1). In the second predictive-model predicted value computation 332, from XA2 (322) and XB (323), a second predicted value (PY2) is computed based on the second predictive model (M2).

In the first predicted-value error span computation 333, from Y (320) and the first predicted value (PY1), an error span (first predicted error span: EY1) of the first predicted value (PY1) is computed. In the second predicted value error span 334, from Y (320) and the second predicted value (PY2), an error span (second predicted error span: EY2) of the second predicted value (PY2) is computed.

In the ensemble predicted error span computation 335, from the first and second predicted error spans (EY1 and EY2), an ensemble predicted error span (EG) is computed.

In the threshold matching/anomaly judgment 336, the ensemble predicted error span (EG) is compared and matched with a threshold (H) for the anomaly judgment. And, a result of this anomaly judgment (the presence or absence of the anomaly) and information containing the first and second predicted error spans (EY1 and EY2) are outputted as detection information 34 (D1).

<Model Creating Process>

Figure 5:
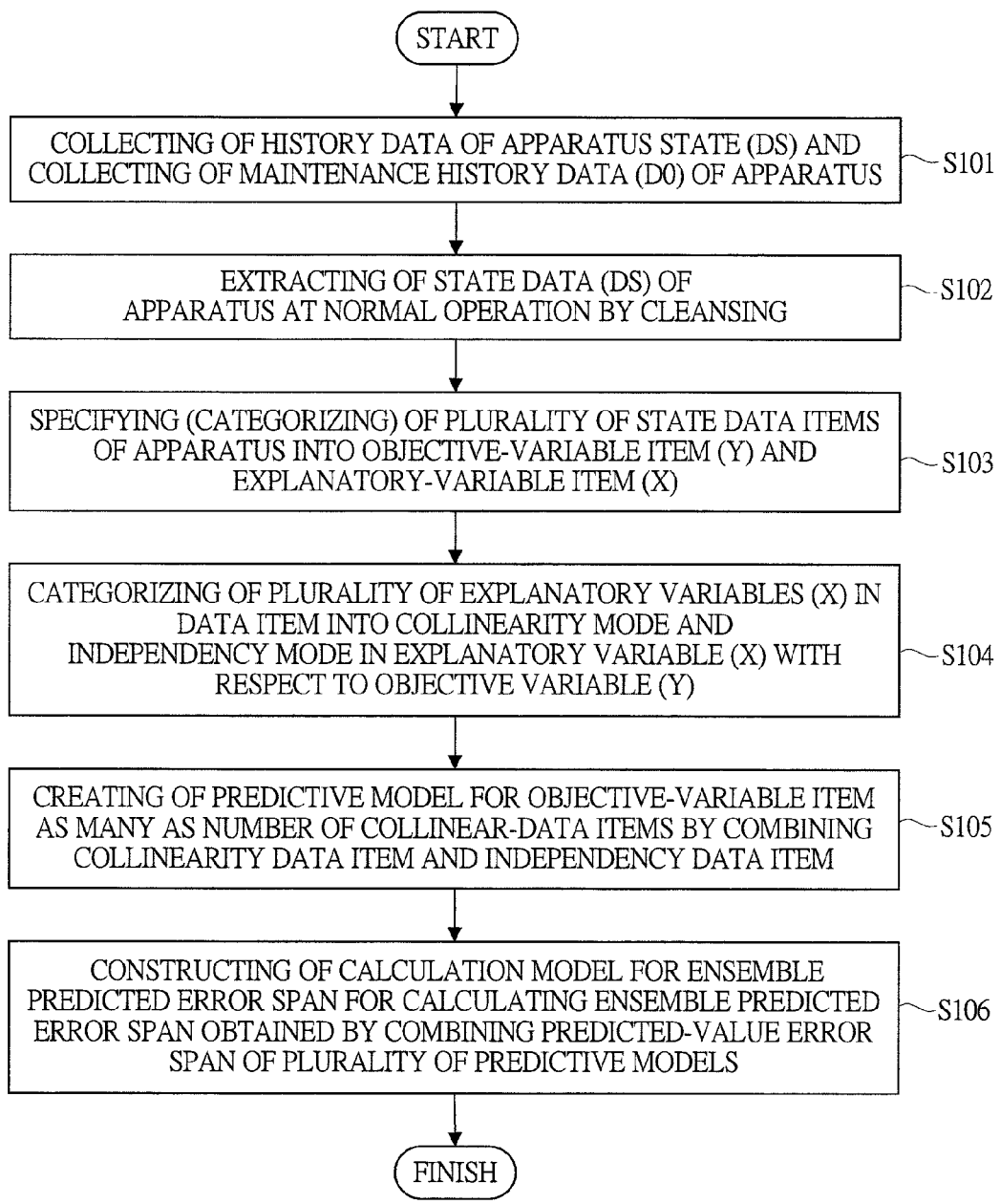
FIG. 5 is a diagram showing a process flow of the model creation module.

FIG. 5 shows a process flow of executing the model creation by the model creation module 2. A main unit for each process step is the model creation module 2 (program).

In a step of S101, the data of the history 201 of the state measurement data DS of the apparatus 1 is collected, and besides, the maintenance history data (D0) of the apparatus 1 is collected. In a step of S102, by the data cleansing 21, the state measurement data DS at the normal operation of the apparatus 1 is cleansed and extracted.

In a step of S103, by the data item categorization 22, the objective-variable data item (Y) and the explanatory-variable data item (X) are specified from the plurality of pieces of state measurement data DS of the apparatus 1. In a step of S104, by the data item categorization 22, each of the plurality of explanatory-variable data items (X) in the data items of the plurality of pieces of state measurement data DS is categorized into a collinearity mode and an independency mode of the explanatory-variable data item (X) with respect to the objective-variable data item (Y). That is, they are categorized into the collinearity explanatory-variable data items (XA: XA1 and XA2) and the independency explanatory-variable data item (XB) described above.

In a step of S105, by the predictive model construction 23, in a combination of the collinearity explanatory-variable data item (XA) and the independency explanatory-variable data item (XB), the predictive model of each of the collinearity explanatory-variable data items (XA) with respect to the objective-variable data item (Y) is created as many as the number of (in this example, two) collinearity explanatory-variable data items (XA). That is, for example, the first predictive model (M1) corresponding to a combination of XA1 and XB and the second predictive model (M2) corresponding to a combination of XA2 and XB described above are created.

In a step of S106, by the ensemble predicted error span computation model construction 24, an ensemble predicted error span computation model (MG) in combination of the predicted value error spans (predicted error spans: EY) of the plurality of predictive models (M1 and M2) for computing the ensemble predicted error span (EG) is constructed. The constructed model is stored in the sub-module of the storage 25.

<Monitoring Execution Process>

Figure 6:
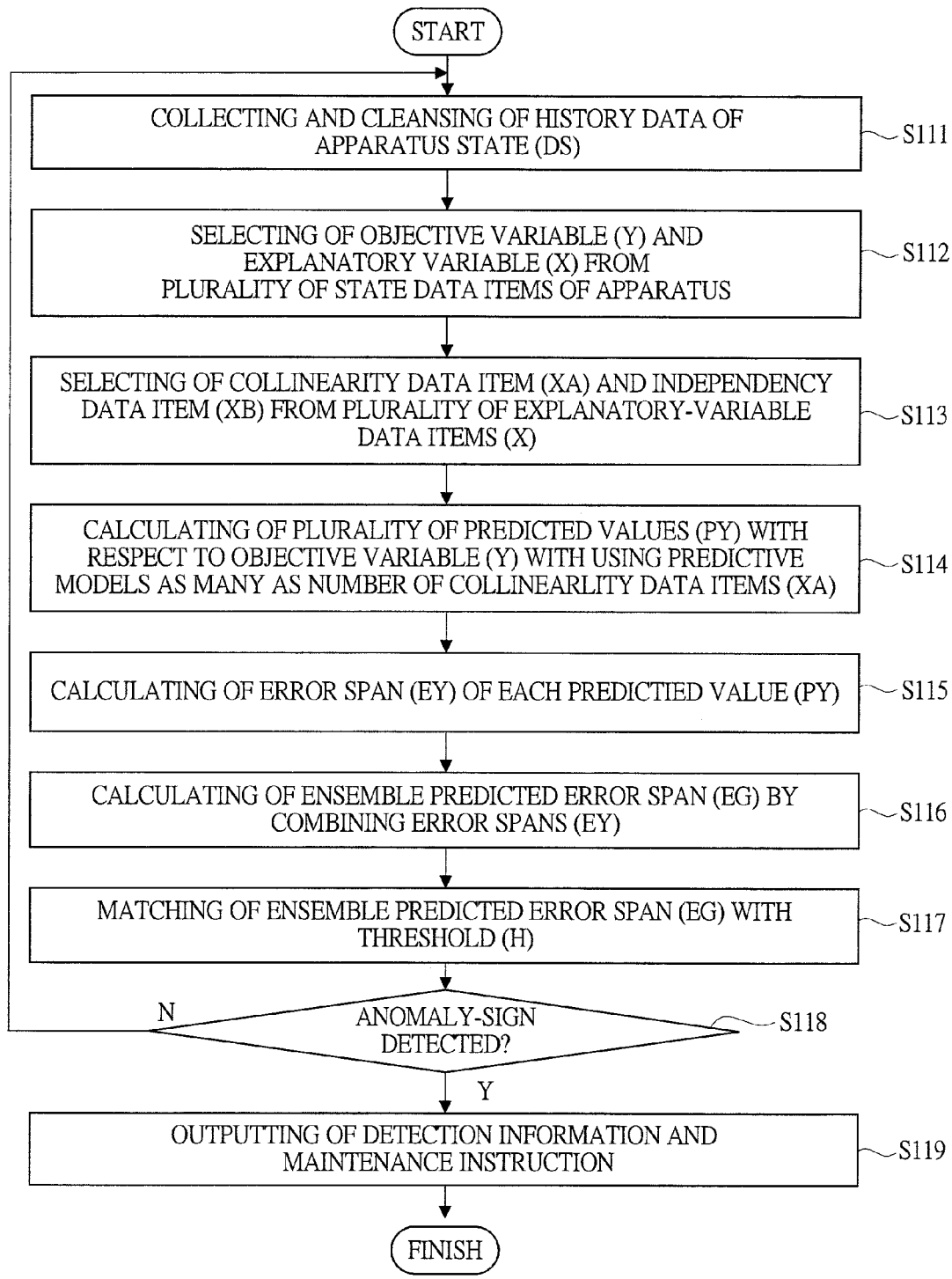
FIG. 6 is a diagram showing a process flow of the monitoring execution module.

FIG. 6 shows a process flow of executing the monitoring by the monitoring execution module 3.

In a step of S111, the plurality of pieces of state measurement data DS of the apparatus 1 are collected, and are cleansed by the data cleansing 31. In a step of S112, by the data item selection 32, the objective-variable data item (Y) and the explanatory-variable data item (X) are selected from the plurality of state-measurement data items of the apparatus 1. In a step of S113, by the data item selection 32, the collinearity explanatory-variable data item (XA) and the independency explanatory-variable data item (XB) are selected from the plurality of explanatory variable data items (X).

In a step of S114, by the anomaly sign judgment 33, by using the plurality of predictive models as many as the number of collinearity explanatory-variable data items (XA), the plurality of predicted values (PY) with respect to the objective-variable data item (Y) are computed. In a step of S115, the error span (EY) of each predicted value (PY) is computed.

In a step of S116, by the ensemble predicted error span computation 335, the ensemble predicted error span (EG) is computed in combination of the error spans (EY) with each other. In a step of S117, the ensemble predicted error span (EG) and the threshold (H) are compared and matched with each other. As a result of the comparison, in a step of S118, it is judged whether the anomaly sign has been detected or not, and, if it has been detected (Y), the detection information 34 (D1) and the maintenance instruction are outputted in a step of S119.

Hereinafter, the apparatus state measurement data (DS), the predictive model (M), the predicted value (PY), the predicted error span (EY), a normalized predicated error span (EY'), the ensemble predicted error span (EG), and others are exemplified for the descriptions.

<State Data at Normal Time>

FIG. 7 shows an example of the data item of the state measurement data DS when the state of the apparatus 1 is normal. It shows sequentially as (a) apparatus state parameter P1—"objective-variable data item value (Y)" 220y, (b) apparatus state parameter P2—"first collinearity explanatory-variable data item value" (XA1) 221x, (c) apparatus state parameter P3—"second collinearity explanatory-variable data item value (XA2)" 222x, and (d) apparatus state parameter P4—"independency explanatory-variable data item value (XB)" 223x. A horizontal axis (t) represents the operating time of the apparatus 1, and a vertical axis represents each data item value.

<Predicted Value>

FIG. 8 shows an example of the predicted value data (PY) of the objective-variable data item (Y) 220y based on the predictive models (M1 and M2). A symbol (a) shows a first predicted value (PY1) 331p corresponding to P2-XA1 in (b) and P4-XB in (d) in FIG. 7 based on the first predictive model (M1) of Y, and a symbol (b) shows a second predicted value (PY2) 332p corresponding to P3-XA2 in (c) and P4-XB in (d) in FIG. 7 based on the second predictive model (M2) of Y.

<Predicted Error Span>

FIG. 9 shows an example of the error span data (predicted error span: EY) of each of the predicted values (PY1 and PY2) with respect to the objective-variable data item (Y). A symbol (a) shows a PY1 (first) predicted error span 333e (EY1) corresponding to PY1 in (a) in FIG. 8. A symbol (b) shows a PY2 (second) predicted error span 334e (EY2) corresponding to PY2 in (b) in FIG. 8.

Each symbol of 333v and 334v shown by large arrows in the error span (EY) represents a span width with respect to a reference value.

<Normalized Predicted Error Span>

FIG. 10 shows an example of the normalized error span data (normalized predicted error span: EY') of the predicted value (PY) with respect to the objective-variable data item (Y). A symbol (a) shows a PY1 (first) normalized predicted error span 333ek (EY1) corresponding to EY1 in (a) in FIG. 9. A symbol (b) shows a PY2 (second) normalized predicted error span 334ek (EY2') corresponding to EY1 in (b) FIG. 9. Similarly to the above descriptions, each symbol of 333vk and 334vk represents the span width.

<Ensemble Error Span>

FIG. 11 shows an example of the ensemble error span data (EG) based on the normalized predicted error span (EY'), more particularly, an ensemble average value (GA) and an ensemble maximum value (GB). A symbol (a) shows an ensemble average value (GA) 335e which is a first ensemble error span (EG1) in combination of EY1' in (a) with EY2' in (b) in FIG. 10. Similarly, A symbol (b) shows an ensemble maximum value (GB) 336e which is a second ensemble error span (EG2) in combination of EY1' in (a) with EY2' in (b) in FIG. 10. Similarly to the above descriptions, each symbol of 335v and 336v represents the span width. Symbol of 335s1 and 336s1 represent upper-limit values of the span widths 335v and 336v, respectively. Symbols of 335s2 and 336s2 represent lower-limit values of the span widths 335v and 336v, respectively.

<Data Item Categorization>

FIG. 12 shows the data item categorization (table) 250 which represents information data obtained by categorizing the data items of the state measurement data DS of the apparatus 1. As categories (types) of the data items, the objective variable (Y), explanatory variable (X), the collinearity, and the independency, which are described above, are included. In the apparatus state parameters "P" (for example, P1 to P4), the objective variable (Y) is corresponded to flag ON (1) for the P1, that is, the P1 is specified as the objective-variable data item (Y). Similarly, the explanatory variable (X) and the collinearity are flagged ON for the P2, that is, the P2 is specified as the first collinearity explanatory-variable data item XA1. The explanatory variable (X) and the collinearity are flagged ON for the P3, that is, the P3 is specified as the second collinearity explanatory-variable data item XA2. The explanatory variable (X) and the independency are flagged ON for the P4, that is, the P4 is specified as the independency explanatory-variable data item XB.

<Predictive Model>

FIG. 13 shows an information data (table) for the predictive models for predicting the objective-variable data item (Y) among the state-measurement data items of the apparatus 1. To each model having a model name, an intercept and each of parameters (for example, P1 to P4) are corresponded. For example, in the first predictive model (M1) whose model name is "Model 1", the intercept is 0.1, a parameter P2 (XA1) is 1.2, and a parameter P4 (XB) is 0.9. In the second predictive model (M2) whose model name is "Model 2", the intercept is 0.0, a parameter P3 (XA2) is 1.1, and a parameter P4 (XB) is 1.0.

<Cross-Correlation Matrix>

FIG. 14 shows a cross-correlation matrix between data items basically used for the categorization by the sub-module of the data item categorization 22. The matrix relates to the above-described parameters P1 (Y), P2 (XA1), P3 (XA2), and P4 (XB). For example, a correlation value between the P1 (Y) and the P2 (XA1) is 0.9.

<State Data at Anomaly Sign>

FIG. 15 shows state-measurement data items (parameter values) obtained when the apparatus 1 has the anomaly sign, with respect to the state data in the normal state of the apparatus 1 of FIG. 7. A symbol (a) shows the normal objective-variable data item value (Y) 220y, a symbol (b) shows the first collinearity explanatory-variable data item value (XA1) 221x with the anomaly sign, a symbol (c) shows the normal second collinearity explanatory-variable data item value (XA2) 222x, and a symbol (d) shows the normal independency explanatory-variable data item value (XB) 223x. In the XA1 (221x) with the anomaly sign in (b), a symbol "221f" indicates a time delay as the anomaly sign.

FIG. 16 shows the predicted value data (PY1 and PY2) obtained when the apparatus 1 has the anomaly sign, with respect to the predicted value data (PY1 and PY2) in the normal state of the apparatus 1 of FIG. 8. A symbol (a) shows a first predicted value 331p (PY1) of the Y based on the first predictive model (M1), and includes a time delay as the anomaly sign indicated by a symbol 331f. A symbol (b) shows the normal predicted value 332p (PY2) of the Y based on the second predictive model (M2).

FIG. 17 shows predicted error span data (EY1 and EY2) obtained when the apparatus 1 has the anomaly sign, with respect to the predicted error span data (EY1 and EY2) in the normal state of the apparatus 1 of FIG. 9. A symbol (a) shows a first predicted error span 333e (EY1) relative to the first predicted value (PY1), and includes the anomaly span indicated by a symbol 333f. A symbol (b) shows the normal second predicted error span 334e (EY2) relative to the second predicted value (PY2). The anomaly span 333f is a span having a magnitude exceeding a span width 333v.

FIG. 18 shows a first ensemble predicted error span 335e and a second ensemble predicted error span 336e obtained when the apparatus 1 has the anomaly sign, with respect to the ensemble predicted error span (EG) in the normal state of the apparatus 1 of FIG. 11. A symbol (a) shows an ensemble average value 335e (GA), and a symbol (b) shows an ensemble maximum value 336e (GB). Anomaly spans 335f and 336f are those having magnitudes exceeding span widths 335v and 336v, respectively.

<Model Creation>

Next, a model creating process is described. In this configuration, in order to monitor the anomaly sign of the apparatus 1, the monitoring model (predictive model) is previously created in a procedure described below.

The state measurement data DS containing three or more items of the apparatus 1 (an energy converting apparatus such as a cogeneration apparatus) is transmitted to the model creation module 2 at any time for each collecting cycle (FIG. 1). The model creation module 2 (FIG. 3) accumulates the history (201) of the state measurement data DS. Also, execution information of the maintenance operation performed to the apparatus 1 by the maintenance operator (maintenance apparatus 54) is recorded and accumulated in the maintenance operation history record module 8 as a maintenance history data D0. The model creation module 2 references the maintenance history data D0.

When the model creation module 2 constructs an ensemble predicted error span computation model at an instructed timing, first, in the step of S101 of FIG. 5, the sub-module of the data cleansing 21 collects the history 201 of the state (state measurement data DS) of the apparatus 1, and collects the maintenance history data D0 of the apparatus 1. Subsequently, in the step of S102, the sub-module cleanses the data, so that the state measurement data DS at the time of a normal operation of the apparatus 1 is extracted. More specifically, normal operation time section information of the apparatus 1 is extracted from the maintenance history data D0, and the data item (state data item) of the state measurement data DS in the time section is extracted.

Next, in the step of S103, the sub-module of the data item categorization 22 of the model creation module 2 categorizes (specifies) the plurality of state data items of the apparatus 1 into the objective-variable data item (Y) and the explanatory-variable data item (X). This categorization (specification) is performed based on the flag specification (FIG. 12) previously recorded in the data item categorization (table) 250 of the sub-module of the storage 25. When the objective variable (Y) is determined, the explanatory variable (X) is automatically determined from the Y. While the specification of the objective-variable data item (Y) is not limited, at least one of a kinetic output, a thermal output, a power output, or an energy conversion efficiency in the apparatus 1 may be previously specified.

In the data item categorization 22, the rest of other state data items are previously specified as the explanatory-variable data items (X). While the specification of the explanatory variable data items (X) is not limited, at least one of the followings is included. That is fuel supply amount, fuel burning temperature, fuel burning pressure, movement velocity of a mechanical part, oscillation of the mechanical part, acceleration of the mechanical part, distortion of the mechanical part, audio of the mechanical part, abrasion loss of the mechanical part, a component of a lubricating oil, a pressure of the lubricating oil, a temperature of the lubricating oil, a voltage of an electrical part, a current of the electrical part, a frequency of the electrical part, an environmental temperature, an environmental humidity, an environmental atmospheric pressure, a voltage of an electric power system, a current of the electric power system, operating time of the apparatus, or operating time of a part.

As the objective-variable data item (Y), any number equal to or larger than one may be specified. As the number of the explanatory-variable data item (X), any number equal to or larger than two may be specified.

In the specification (categorization) in the step of S103, in this example, the objective-variable data item (Y) is automatically specified by a computer of the system based on the setting by a human (system administrator U2), and the explanatory-variable data item (X) is also determined from the specified objective-variable data item (Y).

In FIG. 12 described above, an example of the data item categorization (table) 250 is shown. In this example, four types of parameters P1 (Y), P2 (XA1), P3 (XA2), and P4 (XB) are included. In this example, a case of one objective-variable data item (Y) and three explanatory-variable data items (XA1, XA2, and XB) is described. However, the case does not lose generality.

Subsequently, in the step of S104, the sub-module of the data item categorization 22 categorizes the explanatory-variable data items (X) into the collinearity mode and the independency mode with respect to the objective-variable data item (Y). The categorization is automatically performed based on the cross-correlation coefficient matrix (FIG. 14) between the data items computed by the sub-module of the data item categorization 22.

In the example of FIG. 14, specifically, a threshold (0.6 in this example) for judging the magnitude of the correlation coefficient is previously defined, and the categorization is made depending on the magnitude with respect to the threshold. That is, the P2 (its correlation coefficient 0.9>0.6) and the P3 (its correlation coefficient 0.8>0.6), which are the explanatory-variable data items having the larger correlation coefficient than that of the P1 which is the objective-variable data item (Y), are categorized as the collinearity data items (XA1 and XA2), and the P4 (its correlation coefficient 0.3<0.6), which is the explanatory-variable data item having the smaller correlation coefficient, is categorized as the independency data item (XB). Also from a cross-correlation coefficient (0.7>0.6) between the P2 (XA1) and the P3 (XA2), which are the explanatory-variable data items, the collinearity mode can be confirmed. The categorized results are recorded as the data item categorization (table) 250 in the sub-module of the storage 25.

<Categorizing Method>

FIG. 19 shows a data item categorizing method (S104) in another example. In this example, the categorization is made by a graphical causation model based on a partial correlation coefficient described in the above-described Patent Document 3 and Non-Patent Document 4. At top points (nodes) of a graph (graphical causation model) of FIG. 19, the parameter P1 of the objective-variable data item (Y) (220), the parameter P2 of the first explanatory-variable data item (collinearity explanatory-variable data item XA1) (221), the parameter P3 of the second explanatory-variable data item (collinearity explanatory-variable data item XA2) (222), and the parameter P4 of the third explanatory-variable data item (independency explanatory-variable data item XB) (223) are arranged. Links (cross-correlation coefficients) connecting top points with each other indicate a magnitude and a direction of the causation.

For example, the P2 (XA1) and the P3 (XA2), which are the explanatory-variable data items (X), have a strong partial correlation relation between each other (the partial correlation coefficient therebetween=0.8), and both are the cause for P1 (Y) which is the objective variable data item (Y) (the partial correlation coefficient therebetween=0.7). Therefore, these parameters (P2 and P3) are judged as the collinearity data items (collinearity mode). On the other hand, the P4 (XB) which is another explanatory-variable data item is the cause for the P1 which is the objective-variable data item (Y) (the partial correlation coefficient therebetween=0.6). However, for the P2 (XA1) and the P3 (XA2), it has only a weak partial correlation relation (the partial correlation coefficient therebetween=0.1) and has no causation relation, and therefore, is judged as the independency data item (independency mode). The above-described categorization can be automatically performed by the sub-module of the data item categorization 22.

In the above-described example of the transition charts at the normal time in FIG. 7, the (a) shows the example of the P1 (220y) which is the objective-variable data item (Y), the (b) shows the example of the P2 (221x) which is the collinearity explanatory-variable data item (XA1), the (c) shows the example of the P3 (222x) which is the collinearity explanatory-variable data item (XA2), and the (d) shows the example of the P4 (223x) which is the independency explanatory-variable data item (XB).

Next, in the step of S105, the predictive model construction module 23 of the model creation module 2 constructs two predictive models (M1 and M2) individually corresponding to the collinearity data items (XA1 and XA2). The first predictive model (M1) (231) is constructed as expressed by the following Equation (1) based on the regression analysis as a linear regression equation with taking the P2 which is the first collinearity data item (XA1) and the P4 which is the independency data item (XB) as the input and the first predicted value (PY1) of the P1 which is the objective-variable data item (Y) as the output. A wavy line attached above the P represents the predicted value.

(Equation 1)

$$\tilde{P}_1(t,2) = a_{20} + a_{22} \cdot P_2(t) + a_{24} \cdot P_4(t) \qquad (1)$$

On the other hand, the second predictive model (M2) (232) is constructed as expressed by Equation (2) based on the regression analysis as a linear regression equation taking the P3 (222) which is the second collinearity data item (XA2) and the P4 (223) which is the independency data item (XB) as the input and the second predicted value (PY2) of the P1 which is the objective-variable data item (Y) as the output.

(Equation 2)

$$\tilde{P}_1(t,3) = a_{30} + a_{33} \cdot P_3(t) + a_{34} \cdot P_4(t) \qquad (2)$$

Each symbol "a" in the Equation (1) and the Equation (2) represents a coefficient of the linear regression equation, and a left index of a two-digit index represents a type of the collinearity explanatory-variable data item (XA) corresponding to the predictive model, and a right index thereof represents a type of the explanatory-variable data item (X). Note that a symbol "a" whose right index is 0 represents the intercept of the regression equation. Also, a parameter "t" in parenthesis of each data item in the Equation (1) and the Equation (2) represents the operating time of the apparatus 1, and each of parameters "2" and "3" represents a type of the collinearity explanatory-variable data item (XA) corresponding to each of the predictive models.

In the transition chart of PY1 (331p) in (a) in FIG. 8, a transition chart of the first predicted value (PY1) of the P1 (Y) (220) as the output of the first predictive model (M1) (231 in FIG. 3) created with taking the P2-XA1 (221x) in (b) and the P4-XB (223x) in (d) in FIG. 7 as the input is shown. Also, in the transition chart of the PY2 (332p) in (b) FIG. 8, a transition chart of the second predicted value (PY2) of the P1 (Y) (220) as the output of the second predictive model (M2) (232 in FIG. 3) created with taking the P3-XA2 (222x) in (c) and the P4-XB (223x) in (d) in FIG. 7 as the input is shown.

A general formula for extending the predictive models in the above-described Equation (1) and Equation (2) into an arbitrary number of models is expressed by the following Equation (3).

(Equation 3)

$$\tilde{P}_k(t,m) = a_{m0} + a_{mm} \cdot P_m(t) + \sum_n a_{mn} \cdot P_n(t) \qquad (3)$$

In the above-described Equation (3), a symbol "$P_k$" represents an objective-variable data item (Y) having "k" as an identification number, a symbol "$p_m$" represents a collinearity explanatory-variable data item (XA) having "m" as an identification number, and a symbol "$P_n$" represents an independency explanatory-variable data item (XB) having "n" as an identification number. In the above-described Equation (1) and Equation (2), a case that one independency data item (XB) having "$P_n$=P4" exists is described. However, a plurality of Pn may exist for one predictive model.

Note that, in the present embodiment, as described above, the predictive models have the form of the linear regression equation. However, the form is not limited to this, and the non-linear model can also be created by using the GLM method, the MARS method, the GAM method, or the non-linear model method described in the above-described Non-Patent Document 1 and Non-Patent Document 2.

Also, the linear model or the non-linear model is used depending on each type of the state data item, and both of these models may be mixed in the above-described ensemble predictive model group (251 in FIG. 3). In this manner, for the state data items having the non-linear relation therebetween, the accuracy of the predictive model can be increased, so that there is an effect of improving the accuracy in detecting the anomaly sign.

For example, in a case that the objective variable (Y) is an engine output and the explanatory variables (X) are an opening/closing degree of a fuel valve (X1) and a supercharger pressure (X2), a model of predicting the engine output (Y) from the opening/closing degree of the fuel valve (X1) may be a linear model, and a model of predicting the engine output (Y) from the supercharger pressure (X2) may be a non-linear model obtained by LOG transformation of the pressure or adding a delay waste time for responding to an exhaust pressure.

Next, in the step of S106, the ensemble predicted error span computation model construction module 24 of the model creation module 2 constructs a model (ensemble predicted error span computation model) of computing the ensemble predicted error span (EG) in combination with the predicted error spans (EY1 and EY2) of the plurality of predictive models (M1 and M2). A definition of the error span (predicted error span) (EY: EY1 and EY2) of each of the predicted values (PY: PY1 and PY2) of the first predictive model (M1) 231 and the second predictive model (M2) 232 is expressed by Equation (4) and Equation (5) with using the predicted value (PY: PY1 and PY2) of the P1 (Y) in the above-described Equation (1) and Equation (2).

(Equation 4)

$$E_1(t,2) = P_1(t) - \tilde{P}_1(t,2) \quad (4)$$

(Equation 5)

$$E_1(t,3) = P_1(t) - \tilde{P}_1(t,3) \quad (5)$$

A general formula obtained by extending the definition of the predicted error span (EY: EY1 and EY2) in the above-described Equation (4) and Equation (5) into an arbitrary model is defined by the following Equation (6).

(Equation 6)

$$E_k(t,m) = P_k(t) - \tilde{P}_k(t,m) \quad (6)$$

In the transition chart of the EY1 (333e) in (a) FIG. 9, a transition chart of the first error span (EY1) based on the Equation (4) between the P2-XA1 (221x) in (b) in FIG. 7 and the first predicted value (PY1) (331p) based on the M1 (231) in (a) in FIG. 8 is shown. Also, in the transition chart of the EY2 (334e) in (b) in FIG. 9, a transition chart of the second error span (EY2) based on the Equation (5) between the P3-XA2 (221x) in (c) in FIG. 7 and the second predicted value (PY2) (332p) based on the M2 (232) in (b) in FIG. 8 is shown.

In a case (first ensemble predicted error span EG1) that the ensemble average value (GA) is used as a method of combining the models for computing the ensemble predicted error span (EG) in combination with the plurality of predicted error spans (EY: EY1 and EY2) in the above-described Equation (4) and Equation (5), a computation formula in the case is defined by the following Equation (7).

(Equation 7)

$$E_1(t) = \frac{1}{2} \cdot \left\{ \frac{E_1(t,2)}{\Delta_2} + \frac{E_1(t,3)}{\Delta_3} \right\} \quad (7)$$

Also, as another example, in a case (second ensemble predicted error span EG2) that the ensemble maximum value (GB) is used as a method of combining the models for computing the ensemble predicted error span (EG) in combination with the plurality of predicted error spans (EY: EY1 and EY2) in the above-described Equation (4) and Equation (5), a computation formula in the case is defined by the following Equation (8).

(Equation 8)

$$E_1(t) = \max\left\{ \frac{E_1(t,2)}{\Delta_2}, \frac{E_1(t,3)}{\Delta_3} \right\} \quad (8)$$

A symbol "$\Delta_2$" in a denominator of a first term on a right hand side of each of the above-described Equation (7) and Equation (8) represents the span width (333v) of the Equation (4) (EY1 (333e) in FIG. 9) of the predicted error span (EY1) of the predicted value (PY1) based on the first predictive model (M1) (231), and normalizes the first term on the right hand side so that the magnitude of the span in the normal state is uniformed with that of the other predicted error span for the combination. Also, a symbol "$\Delta_3$" in a denominator of a second term on the right hand side of the above-described Equation (7) and Equation (8) represents the span width (334v) of the Equation (5) (EY2 (334e) in FIG. 9) of the predicted error span (EY2) of the predicted value (PY2) based on the second predictive model (M2) (232), and normalizes the second term on the right hand side so that the magnitude of the span in the normal state is uniformed with that of the other predicted error span for the combination.

Also, each value of these normalizing coefficients ($\Delta_2$ and $\Delta_3$) may be not the magnitude of the span in the normal state but changed by judging the degree of importance of that data item from the design knowledge or knowledge from failure experiences for the apparatus 1. Even if the normalization of the error span of an arbitrary data item is manipulated, this manipulation does not affect the error spans of other data items. With this feature, the accuracy of the anomaly detection can be increased by feeding back the design knowledge or knowledge from failure experiences for the apparatus 1.

In the EY1' (333ek) in (a) in FIG. 10, a normalized value (first normalized predicated error span) from the first predicted error span (EY1 (333e) in FIG. 9) is shown. Similarly, for the EY2' (334ek) in (b), a normalized value (second normalized predicated error span) from the second predicted error span (EY2 (334e) in FIG. 9) is shown.

In the GA (335e) in (a) in FIG. 11, a transition chart of the first ensemble predicted error span (EG1) based on the ensemble average value (GA) of the predicted error span (normalized predicted error span) in the above-described Equation (7) is shown. In the GB (336e) in (b) in FIG. 11, a transition chart of the second ensemble predicted error span (EG2) based on the ensemble maximum value (GB) of the predicted error span (normalized predicted error span) in the above-described Equation (8) is shown.

Note that a general formula obtained by extending the predicted error span computation model in the above-described Equation (7) and Equation (8) into an arbitrary number of models is expressed by each of the following Equation (9) and Equation (10).

(Equation 9)

$$E_k(t) = \frac{1}{M} \cdot \sum_m \left\{ \frac{E_k(t,m)}{\Delta_m} \right\} \quad (9)$$

(Equation 10)

$$E_k(t) = \max_k \left\{ \frac{E_k(t,m)}{\Delta_m} \right\} \quad (10)$$

In the above-described Equation (9), a symbol "M" represents the number of predicted error span computation models, that is, the number of collinearity explanatory-variable data items (XA).

At the last of the model creating process step of FIG. 5, the model creation module 2 stores the constructed predictive model (Equation (3)) of the objective-variable data item (Y) and the constructed ensemble predicted error span computation model (Equation (9) and Equation (10)) as the ensemble predictive model group 251 in the sub-module of the storage 25.

<Monitoring Execution>

In the present embodiment, in order to monitor the anomaly sign of the apparatus 1, the monitoring is executed in a procedure described below by the monitoring execution module 3 based on the created model.

The state measurement data DS of the apparatus 1 is transmitted to the model creation module 2 at any time for each collecting cycle (FIG. 1). The monitoring execution module 3 (FIG. 4) executes the monitoring based on the data item categorization (table) 250 and the ensemble predictive model group 251 stored in the sub-module of the storage 25.

When the monitoring execution module 3 executes the monitoring for each collection cycle, first, in the step of S111 of FIG. 6, the sub-module of the data cleansing 31 collects and cleanses the history 301 of the state (DS) of the apparatus 1. As the cleansing, the defective data is removed or interpolated.

Subsequently, in the step of S112, the sub-module of the data item selection 32 of the monitoring execution module 3 selects the objective variable (Y) and the explanatory variable (X) among the plurality of data items of the history 301 of the apparatus state (DS), and then, in the step of S113, selects the collinearity data item (XA) and the independency data item (XB) among the plurality of explanatory-variable data items (X). More specifically, the selection is made based on the data item categorization table 250 (FIG. 12) stored in the sub-module of the storage 25 of the model creation module 2.

Subsequently, in the step of S114, the sub-module of the anomaly sign judgment 33 of the monitoring execution module 3 computes the plurality of predicted values (PY: PY1 and PY2) for the objective-variable data item (Y) by using the predictive models (M1 and M2) as many as the number of the plurality of collinearity explanatory-variable data items (XA). More specifically, the M1-PY1 computation 331 and the M2-PY2 computation 332 which are means of computing predicted values compute the plurality of predicted values (PY: PY1 and PY2) for the objective-variable data item (Y) based on the above-described Equation (3) configuring a part of the ensemble predictive model group 251 stored in the sub-module of the storage 25 of the model creation module 2.

FIG. 15 shows an example of the transition chart of the data item with the anomaly sign. In this example, in (b), a time delay (221f) occurs in the P2-XA1 (221x) as the anomaly sign, and no anomaly sign occurs in other data items (P1, P3, and P4).

In the PY1 (331p) in (a) and PY2 (332p) in (b) in FIG. 16, the predicted values (PY: PY1 and PY2) for the objective-variable data item P1 (Y) (220y) of (a) in FIG. 15 computed from the data item (P2-XA1) of (b) in FIG. 15 containing the anomaly sign based on the above-described Equation (1) and Equation (2) realizing the above-described Equation (3) in the above-described example are shown, respectively.

To the first predicted value (PY1) (331p) of the P1 (Y) of (a) in FIG. 16 which is predicted in combination with the P2-XA1 (221x) (with the anomaly sign) in (b) and the P4-XB (223x) in (d) FIG. 15, a time delay (331f) caused by the time delay (221f) in the P2-XA1 (221x) is reflected.

On the other hand, the second predicted value (PY2) (332p) of the P1 (Y) of (b) in FIG. 16 which is predicted in combination with the P3-XA2 (222x) in (c) and the P4-XB (223x) in (d) in FIG. 15 shows the same transition that of the second predicted value (PY2) (332P) of the P1 (Y) in the normal state of the apparatus 1 in (b) in FIG. 8.

Subsequently, in the step of S115, the sub-module of the anomaly sign judgment 33 computes the error spans (EY1 and EY2) of the plurality of predicted values (PY1 and PY2) for the objective-variable data item (Y). More specifically, the PY1-EY1 computation 333 and the PY2-EY2 computation 334 which are means of computing the predicted error span compute the plurality of predicted error spans (EY) of the objective-variable data item (Y) based on the Equation (6) configuring a part of the ensemble predictive model group 251 stored in the sub-module of the storage 25 of the model creation module 2.

In the EY1 (333e) in (a) and EY2 (334e) in (b) in FIG. 17, the predicted error spans (EY: EY1 and EY2) of the P1 (Y) (220y) computed from the predicted value (PY) containing the time delay (331f) of FIG. 16 based on the above-described Equation (4) and Equation (5) realizing the above-described Equation (6) in the above-described example is shown.

In the EY1 (333e) in (a) in FIG. 17 which is the predicted error span of the PY1 (331p) {predicted value in combination with the P2-XA1 (221x) and the P4-XB (223x)} in (a) in FIG. 16, the anomaly span (333f) to which the time delay (331f) of the first predicted value (PY1) (331p) is reflected occurs.

On the other hand, in the EY2 (334e) in (b) in FIG. 17 which is the predicted error span of the PY2 (332p) {predicted value in combination with the P3 (XA2) (222x) and the P4 (XB) (223x)} in (b) in FIG. 16, the same transition with that of the predicted error span (EY2 (334e)) in the normal state of the apparatus 1 in (b) in FIG. 9 is shown.

Subsequently, in the step of S116, the sub-module of the anomaly sign judgment 33 computes the ensemble predicted error span (EG) in combination with the error spans (EY) of the plurality of predicted values (PY) for the objective-variable data item (Y). More specifically, the ensemble predicted error span (EG) computation 335 computes the predicted error span ensemble average value (GA) or the predicted error span ensemble maximum value (GB) which are the ensemble predicted error spans in combination with the plurality of predicted error spans (EY) of the objective-variable data item (Y) based on the above-described Equation (9) or Equation (10) configuring a part of the ensemble predictive model group 251 stored in the sub-module of the storage 25 of the model creation module 2.

In the GA (335e) in (a) in FIG. 18, the predicted error span ensemble average value (GA) of the P1 (Y) (220y) computed from the predicted error spans (EY: EY1 and EY2) containing the anomaly span (333f) of FIG. 17 based on the above-described Equation (7) realizing the computational formula (Equation (9)) for the ensemble average value (GA) in the above-described example is shown. Also, in the GB (336e) in (b) in FIG. 18, the predicted error span ensemble maximum value (GB) of the P1 (Y) (220y) computed from the predicted error spans (EY: EY1 and EY2) containing the anomaly span (333f) of FIG. 17 based on the above-described Equation (8) realizing the computational formula (Equation (10)) for the ensemble maximum value (GB) in the above-described example is shown.

In both of the ensemble average value (GA) (335e) and the ensemble maximum value (GB) (336e), an anomaly span (335f) and an anomaly span (336f) to which the time delay (221f) of the P2-XA1 (221x) in (b) in FIG. 15 is reflected occur, respectively.

Subsequently, in the step of S117, the sub-module of the anomaly sign judgment 33 matches the ensemble predicted error span (EG: EG1 (GA) or EG2 (GB)) with the threshold (H) to judge the anomaly sign of the apparatus 1. More specifically, the threshold matching/anomaly judgment 336 compares the threshold (H) stored in the sub-module of the storage 25 of the model creation module 2 and the computed ensemble predicted error span (EG).

As the threshold (H), a specified value may be previously stored, or the normal span width (335v or 336v in FIG. 11) of the ensemble predicted error span (EG) computed from the normal data in creating the model may be stored as the threshold (335s1, 335s2, 336s1, or 336s2 in FIG. 11). Note that, by applying the normalization of the predicted error span described above to all data items, the threshold can be also a unit quantity as "the threshold=1".

The ensemble predicted error span (EG) (GA (335e) and GB (336e) in FIG. 11) computed from the normal data in creating the model does not exceed the threshold (H) (335s1 and 336s1). The ensemble predicted error span (GA (335e) and GB (336e) in FIG. 18) containing the anomaly span caused by the time delay in this example exceeds the threshold (H) (335s1 and 336s1) at the time of occurrence of the anomaly span (335f and 336f), and therefore, the anomaly sign can be detected.

In the step of S118, the threshold matching/anomaly judgment 336 performs a branch judgment based on the result obtained by matching the threshold (H) with the ensemble predicted error span (EG). If the anomaly has not been detected (N), the procedure returns to the step of S111. If the anomaly has been detected (Y), the procedure goes to the step of S119 to output the detection information 34 (D1) and instruct the maintenance execution for the apparatus 1. More specifically, the monitoring execution module 3 transmits the detection information 34 (D1) to the maintenance operation instruction module 7 of the maintenance managing computer 53 to display the instruction of the maintenance operation on the maintenance apparatus 54 for which the maintenance operation is performed. At this time, the detection information 34 (D1) may be transmitted to the apparatus 1 (with the stop signal D5 in FIG. 1) to activate an operation stop sequence previously installed in the apparatus 1.

The first embodiment describes the example of using either the ensemble average value (GA) (Equation (9)) or the ensemble maximum value (GB) (Equation (10)) as the ensemble predicted error span (EG).

As described above, according to the first embodiment, the model achieving the anomaly detection with high accuracy and the monitoring with using the model can be achieved.

Second Embodiment

Next, a second embodiment of the present invention is described with reference to FIGS. 20 and 21 and others.

<Combination of Ensemble Average Value and Ensemble Maximum Value>

As different from the first embodiment, the second embodiment describes an example of mixing to use both of the ensemble average value (GA: EG1) (Equation (9)) and the ensemble maximum value (GB: EG2) (Equation (10)) of the predicted error span (EY) as the ensemble error span (EG).

As shown in the above-described (a) in FIG. 18, the anomaly span (335f) due to the ensemble average value (GA) is reduced from the width of the original anomaly span (333f in (a) in FIG. 17) by the average. The anomaly spans simultaneously occurring in all state data items are not reduced by the average. However, the anomaly span independently occurring in one state data item is reduced by the average in inversely proportion to the number of data items. Therefore, it can be said that the ensemble average value (GA) has a low sensitivity to the anomaly detection but a high sensitivity to the number of anomaly-occurring data items.

On the other hand, the anomaly span (336f in (b) in FIG. 18) due to the ensemble maximum value (GB) maintains the width of the original anomaly span (333f in (a) in FIG. 17) by tracing the maximum value between data items. There is no difference in the span width between the anomaly spans simultaneously occurring in all state data items and the anomaly span independently occurring in one state data item. Therefore, it can be said that the ensemble maximum value (GB) has a high sensitivity to the anomaly detection but a low sensitivity to the number of anomaly-occurring data items.

Accordingly, as shown in FIGS. 20 and 21, the second embodiment describes a method of judging even an anomaly scale of the apparatus 1 by mixing to combine the ensemble average value (GA) and the ensemble maximum value (GB).

In FIG. 20, an anomaly sign judgment 33B module has a form obtained by expanding the function of the anomaly sign judgment 33 module of FIG. 4. FIG. 21 shows a process flow of the anomaly sign judgment 33B module.

In FIG. 20, in the M1-PY1 computation 331, the PY1 is computed based on the Equation (1) and the M1 is outputted. A numerical symbol 341 represents a regression coefficient multiplier, and a numerical symbol 342 represents an adder. In the PY1-EY1 computation 333, the EY1 is computed from the PY1 based on the Equation (4) and is outputted. A numerical symbol 343 represents an adder, and a numerical symbol 344 represents a normalization coefficient multiplier. Similarly, in the M2-PY2 computation 332, the PY2 is computed based on the Equation (2) and the M2 is outputted. In the PY2-EY2 computation 334, the EY2 is computed from the PY2 based on the Equation (5) and is outputted.

In FIG. 21, the process from a step of S111 to a step of S115 are the same as those described above with reference to FIG. 6. In a step of S116, in the present embodiment, the GA and the GB are computed from the EY (EY1 and EY2) by the EG computation 335. In a step of S116a, the predicted error span ensemble average value (GA) is computed by GA computation 335a, and parallely, in a step of S116b, the predicted error span ensemble maximum value (GB) is computed by GB computation 335b.

In a step of S117, by threshold matching/anomaly judgment 336, the ensemble maximum value (GB) and a predetermined threshold are matched with each other with using the ensemble maximum value (GB) always having the high detection sensitivity to the anomaly sign of the apparatus as the ensemble predicted error span (EG). Then, in a step of S118, the branch judgment about whether the anomaly sign has been detected or not is performed. If the anomaly sign has been detected (Y), the procedure goes to a step of S120.

In a step of S120, by a sub-module of computing a deviation of a ensemble statistical value and performing the anomaly scale judgment 337, a deviation about the ensemble maximum value (GB) and the ensemble average value (GA) is computed (more specifically, a differential value therebetween is computed) and is mutually compared.

In a step of S121, the branch judgment depending on a magnitude of the computed deviation is performed. More specifically, if the deviation has been smaller than the predetermined judgment threshold previously defined ("small"), it is judged that the anomaly has occurred in a large area of the entire apparatus 1, and then, the procedure goes to a step of S119a. In the step of S119a, the apparatus large-area anomaly information (34a) is contained in the detection information 34 (D1) and is transmitted to the maintenance operation instruction module 7, so that an apparatus large-area maintenance (for example, apparatus replacement) is instructed. Conversely, if the deviation has been larger than the predetermined judgment threshold previously defined ("large"), it is judged that the anomaly has occurred in a local area of a part of the apparatus 1, and then, the procedure goes to a step of S119b. In the step of S119b, the apparatus local-area anomaly information (34b) is contained in the detection information 34 (D1) and is transmitted to the maintenance operation instruction module 7, so that an apparatus local-area maintenance (for example, part replacement) is instructed.

As described above, in the second embodiment, by combining the ensemble average value (GA) and the ensemble maximum value (GB), the content and scale of the executed maintenance operation can be effectively determined.

Note that, instead of the ensemble maximum value (GB), a quantile of the individual error span may be used. Also, instead of the ensemble average value (GA), an effective value obtained by computing a root mean square of the individual error span may be used. Further, by generalizing the method described in the second embodiment, a shape of distribution of the ensemble of the predicted error spans (EY) for each collinearity explanatory-variable data item (XA) may be judged.

<Anomaly Sign Other Than Time Delay>

As the example of the anomaly sign occurring in the state measurement data DS of the apparatus 1, the second embodiment has described the time delay (221*f*) in the P2-XA1 (221*x*) in (b) in FIG. 15. However, in the second embodiment, in addition to this, an arbitrary anomaly sign causing a predicted error span larger than that in the normal state between the objective-variable data item (Y) and the explanatory-variable data item (X) can be detected. For example, even when an excessively large value or an excessively small value of the state measurement data DS occurs, the values can be detected as the anomaly sign. Also, even when an oscillatory waveform of the state measurement data DS occurs, this can be detected as the anomaly sign by a previous process of setting a data to which frequency spectrum transformation is performed as the state measurement data.

Third Embodiment

Next, with reference FIGS. 22 to 25, a third embodiment of the present invention is described. In the third embodiment, in addition to the processes by the model creation module 2 and the monitoring execution module 3 of the first embodiment (FIG. 1), a process by the anomaly diagnosis module 4 (anomaly part (candidate) presumption by the anomaly diagnosis) is performed. In the process of estimating the anomaly part, by specifying the sensor S (corresponding data item) of the anomaly cause, a module or a part corresponding to the sensor S (corresponding data item) can be extracted.

<Anomaly Diagnosis>

In the second embodiment, the detection information 34 (D1) containing the large-area anomaly information or the local-area anomaly information of the apparatus 1 is transmitted from the monitoring execution module 3 to the maintenance operation instruction module 7 to instruct an apparatus maintenance target scale (FIG. 1). Further, by transmitting a name of the state data item with the anomaly span and the anomaly candidate estimation information such as a ranking of the anomaly span in descending order of scale so as to be contained in the detection information 34 (D1), an effect of previously defining the maintenance operation is achieved. Accordingly, the third embodiment includes a structure with the anomaly diagnosis module 4 performing such a process.

In the first embodiment, the sub-module of the threshold matching/anomaly judgment 336 matches the ensemble error span (EG) with the threshold (H) for the anomaly judgment (S117 in FIG. 6), and, if the anomaly sign has been detected (S118-Y), the detection information 34 (D1) is transmitted to the maintenance operation instruction module 7 (S119).

Instead of that, in the third embodiment, all of the predicted error spans (EY: EY1 and EY2) of the plurality of predicted values (PY: PY1 and PY2) computed in the step of S115 of FIG. 6 are also transmitted to the anomaly diagnosis module 4 so as to be contained in the detection information 34 (D1). The anomaly diagnosis module 4 ranks the scales of the predicted error spans (EY) corresponding to the respective data items in descending order of scale, and then, transmits the information (information of listing the state data items related to the anomaly with the ranking) to the maintenance operation instruction module 7. The maintenance operation instruction module 7 provides the anomaly candidate estimation information such as the descending-order ranking of the predicted error spans (EY) of each data item to the maintenance operator (U1) using the maintenance apparatus 54. For example, the information is displayed on a screen of a display apparatus of the maintenance apparatus 54. In this manner, an effect capable of accurately instructing a location (such as a module or a part) of the apparatus 1 which is the target of the maintenance operation by the maintenance operator (U1) is achieved.

For example, in a cogeneration apparatus, when an item such as a current, a voltage, or an electric power on an electric generator side is highly ranked as the anomaly candidate estimation information, a power generation control module is instructed as the location of the apparatus 1 which is the target of the maintenance operation by the maintenance operator (U1). Also, when an item such as a rotation speed and an oscillation is highly ranked as the anomaly candidate estimation information, an engine module is instructed as the location of the apparatus 1 which is the target of the maintenance operation by the maintenance operator (U1). Further, when an item such as a temperature of cooling water and a temperature of lubricating oil is highly ranked as the anomaly candidate estimation information, a cooling module is instructed as the location of the apparatus 1 which is the target of the maintenance operation by the maintenance operator (U1).

Still further, the anomaly diagnosis module 4 may include the function of executing the causational analysis with using the graphical modeling disclosed in the Patent Document 3 and Non-Patent Document 4. In this case, not only the information of listing the state data items related to the anomaly with the ranking but also the estimated causational relation, that is an estimated primary cause, are transmitted from the anomaly diagnosis module 4 to the maintenance operation instruction module 7 to provide them to the maintenance operator (U1). In this manner, similarly, the effect of accurately instructing the location of the apparatus 1 which is the target of the maintenance operation can be achieved. In the graphical modeling, the partial correlation coefficient between the state data items is computed to judge a condition independency, and, if the condition independency is established, the link of the graph is cut off, and the causational model is obtained.

Still further, such as emergency automatic shutdown of the apparatus 1, when the clear changing point of the apparatus state due to the anomaly can be extracted, a method of obtaining the causational model by computing a cross-correlation function between the state data items in vicinity of the changing point and determining a temporal relation is effective. The cross-correlation function is a criterion for measuring how degree a first signal "f" matches a time-shifted second signal "g", and is expressed by the following Equation (11) as a function of the degree of the time shift "s".

(Equation 11)

$$R_{fg}(s) = \sum_{n} f(n)g(n-s) \tag{11}$$

The cross-correlation function is useful for detecting a delay time between signals buried in noise. In the above-described Equation (11), when the signal f is taken as the explanatory variable (X) and the signal g is taken as the objective variable (Y), it can be found out from the time shift s either the changing point of the explanatory variable (X) exists in past or future at time of the changing point of the objective variable (Y) and how long they are away from each other on time. Obviously, the changing-time order between the explanatory variables (X) can be also directly found out.

<Cross-Correlation Function>

Next, with reference to FIGS. 22 to 25, a method of obtaining the causational model from the cross-correlation function in the third embodiment is described. FIG. 22 shows a process flow of obtaining the causational model from the cross-correlation function by the anomaly diagnosis module 4. FIG. 23 shows an example of time-series transition of each state data items (P1-Y in (a), P2-XA1 in (b), P3-XA2 in (c), and P4-XE in (d)) of the apparatus 1 as similar to the above description. In the P2-XA1 of (b) in FIG. 23, the anomaly sign is shown, and the time delay 221$f$ is included therein. Each of FIG. 24 shows a result of computing the cross-correlation function based on the state data item. A symbol (a) shows a cross-correlation function (221$c$) between the P2 (XA1) and the P1 (Y), and a symbol (b) shows a cross-correlation function (222$c$) between the P3 (XA2) and the P1(Y). A horizontal axis represents a time-shifting amount (where a right side represents a future direction, and a left side represents a past direction), and a vertical axis represents a value of the cross-correlation function. FIG. 25 shows a causational model (graphical causational model) led from the computation result of the cross-correlation function.

<Process of Obtaining Causational Model>

In the process flow (in which a main process unit is the anomaly diagnosis module 4) of FIG. 22, first, in the step of S401, the changing point of the state data item P1 (P1-Y (220$y$) in (a) in FIG. 23) selected as the objective variable (Y) is detected. While a plurality of detecting methods can be thought out, differential operation can be used as a generally-known method.

Next, in the step of S402, presence/absence of the changing point is judged. In the state data item P1 (Y), two rising-edge changing points (a first changing point 220$v$1 and a second changing point 220$v$2 in (a) in FIG. 23) and two falling-edge changing points (not shown) are present. Here, a second (latter) rising-edge changing point (220$v$2) of the two rising-edge changing points (220$v$1 and 220$v$2) is taken as a target for description. However, the same procedure can be applied to other changing points.

If there is no changing point in the step of S402 (N), the cross-correlation function cannot be computed with high accuracy, and therefore, the procedure branches to the step of S403 to obtain the causational model by using the graphical modeling. In the graphical modeling, the causational model can be obtained by judging the condition independency by computing the partial correlation coefficient between the state data items, and, if the condition independency is established, cutting off the link of the graph, and therefore, even if there is no clear changing point, there is an advantageous point that the computation can be continued.

If the changing point has been present in the step of S402 (Y), the cross-correlation function can be computed with high accuracy, and therefore, the procedure branches to the step of S404. In the step of S404, a data in the vicinity of the changing point is extracted. For the changing point (220$v$2) of the P1-Y (220$y$) in the above example, a data in vicinity of the changing point (220$n$ in (a) in FIG. 23) is extracted.

Next, in the step of S405, a cross-correlation coefficient between the state data item P1 (220$y$) selected as the objective variable (Y) and the state data item (P2, P3, or P4) selected as each explanatory variable (X) is computed. That is, with respect to the P1 (Y) (220$y$), each cross-correlation function of a data in vicinity of a changing point (221$n$ in (b) in FIG. 23) extracted from the P2 (221$x$) selected as the XA1, a data in vicinity of a changing point (222$n$ in (c) in FIG. 23) extracted from the P3 (222$x$) selected as the XA2, and a data in vicinity of a changing point (223$n$ in (d) in FIG. 23) extracted from the P4 (223$x$) selected as the XB is computed by using the above-described Equation (11).

Among these computations, computation results of the cross-correlation functions with the P2 (XA1) and the P3 (XA2) are shown as F1 (221$c$) in (a) and F2 (222$c$) in (b) in FIG. 24, respectively. Note that a computation result (not shown) of the above-described cross-correlation function with the data in the vicinity of the changing point (223$n$) extracted from the P4 (XB) (223$x$) has a constant value without a maximum value.

In the cross-correlation function F1 (221$c$) in (a) in FIG. 24, the time delay 221$f$ has a maximum value (221$m$) at a position time-shifted from a time-shift origin (2210) toward the future direction. Also, in the cross-correlation function F1 (222$c$) in (b) in FIG. 24, a time advance 222$f$ has a maximum value (222$m$) at a position time-shifted from the time-shift origin (222$o$) toward the past direction.

Next, in the step of S406, from the computation results of the cross-correlation functions, the maximum value is searched. As a result, from the above-described cross-correlation function F1 (221$c$) between the P2 (XA1) and the P1 (Y), the maximum value 221$m$ is extracted. From the above-described cross-correlation function F2 (222$c$) between the P3 (XA2) and the P1 (Y), the maximum value 222$m$ is extracted.

Next, in the step of S407, the maximum values are ranked in an order of time shift having the maximum values from the past to the future. As a result, it can be found that the maximum value (221$m$) of the cross-correlation function F1 (221$c$) between the P2 (XA1) and the P1 (Y) is shifted from the time shift origin (2210) toward the future direction correspondingly to the delay (221$f$) with respect to the changing point (220$v$2) of the P1 (Y). On the other hand, it can be found that the maximum value (222$m$) of the cross-correlation function F2 (222$c$) between the P3 (XA2) and the P1 (Y) is shifted from the time shift origin (2220) toward the past direction correspondingly to the advance (222$f$) with respect to the changing point (220$v$2) of the P1 (Y).

Next, in the step of S408, an order of changing transition is rearranged by the time shift amount to create the graphical causational model. The obtained graphical causational model is shown in FIG. 25. In FIG. 25, the graphical model shows that, due to the collinearity explanatory-variable data item P3 (XA2) (222), the objective-variable data item P1 (Y) (220) is shifted, and then, the collinearity explanatory-variable data item P2 (XA1) (221) is shifted.

Note that the method of creating the graphical model is branched depending on the presence or absence of the changing point in the step of S402. However, the graphical causational model obtained by firstly judging the condition independency from the partial correlation coefficient between the state data items in the step of S403 may be corrected from the time causational relation based on the cross-correlation function. If there is no sufficient apparatus knowledge, the arrow direction is determined from the time causational relation based on the cross-correlation function.

From the created graphical model, it can be clarified either the data item selected as the explanatory variable (X) is truly the data item describing the cause or originally the data item to be selected as the objective variable (Y). Also, when a plurality of explanatory-variable data items (X) are shifted, the data item which is the true shift cause among these data items can be specified.

For example, in a cogeneration apparatus, when an item on an electric generator side such as a current, a voltage, and an electric power is highly ranked as the anomaly candidate estimation information, if a direction of the time causational relation based on the cross-correlation function is established from the current to the electric power, a current control system is instructed as the primary cause as the location of the apparatus 1 which is the target of the maintenance operation by the maintenance operator (U1). Also, when an item such as a temperature of cooling water and a temperature of lubricating oil is highly ranked as the anomaly candidate estimation information, if a direction of the time causational relation based on the cross-correlation function is established from the temperature of cooling water to the temperature of lubricating oil, a cooling system is instructed as the primary cause as the location of the apparatus 1 which is the target of the maintenance operation by the maintenance operator (U1). Conversely, if the direction of the relation is established from the temperature of lubricating oil to the temperature of cooling water, an engine combustion system directly acting on the lubricating oil is instructed as the primary cause.

As described above, according to the third embodiment, the anomaly diagnosis module 4 outputs the anomaly part information D2 based on the anomaly diagnosis, and provides the location (such as a module or a part) of the apparatus 1 corresponding to the data item estimated as the anomaly cause to the maintenance operator (U1) as the candidate, and therefore, the maintenance operation can be efficient.

Fourth Embodiment

Next, with reference to the above-described FIG. 1 and others, a fourth embodiment of the present invention is described. In the fourth embodiment, in addition to the configuration of the embodiments described above, a process of part lifetime prediction is further performed by the part lifetime prediction module 5, and also a process of a maintenance plan is further performed by the maintenance plan module 6.

<Lifetime Prediction and Maintenance Plan>

Even if the anomaly sign is caught by the above-described configuration, conventionally, it is not always cleared when the maintenance operation is required to be performed and others. Thus, in the fourth embodiment, by using a method described in Non-Patent Document 5, the model creation module 2 previously creates a lifetime prediction model (DM2). And, after the anomaly diagnosis, the anomaly (cause) part information D2 is transmitted from the anomaly diagnosis module 4 to the part lifetime prediction module 5. The part lifetime prediction module 5 receives the information, and performs a process of predicting the lifetime of the anomalous part by using the lifetime prediction model (DM2). Its result (anomalous part lifetime information D3) is transmitted from the part lifetime prediction module 5 to the maintenance plan module 6.

For example, in a cogeneration apparatus, when the current control system is estimated as a primary cause of an instantaneous fluctuation in power, a lifetime of an electronic part configuring the current control system is estimated from a frequency of occurrence in a certain period. Also, when the cooling system is estimated as a primary cause of an anomaly burning temperature, a lifetime of a cooler (heat exchanger) is estimated from a temperature change of the cooling water.

And, the maintenance plan module 6 creates the maintenance plan information containing time information (schedule information) by computation based on the lifetime prediction result (D3) of the anomalous part, and transmits the created maintenance plan information D4 to the maintenance operation instruction module 7. The maintenance plan information D4 is, in other words, information about a maintenance operation procedure plan, an operator layout plan, and a replaced-part arrangement plan, and others.

For example, the information is about a plan for a replacement procedure of electronic parts configuring the current control system, a plan for a replacement operator layout, a plan for arrangement of replaced electronic parts, and others. Alternatively, the information is about a plan for a cooler replacement procedure, a plan for a cooler cleaning procedure, a plan for replacement operator or cleaning operator layout, a plan for arrangement of a cooler in the replacement, and others.

In the maintenance operation instruction module 7, in accordance with the received maintenance plan information D4, information about the maintenance plan is displayed on, for example, the screen of the display apparatus of the maintenance apparatus 54 of FIG. 2 together with the above-described maintenance instruction information. In this manner, the maintenance operator (U1) can recognize when the maintenance operation is required to be performed for the target location of the apparatus 1 as viewing the information on the screen. That is, there is an effect that, when the maintenance for the apparatus 1 is required, the maintenance operation can be efficiently performed without waste.

Fifth Embodiment

Next, with reference to FIG. 26, a fifth embodiment of the present invention is described. In the fifth embodiment, a remote diagnosis is performed to a plurality of apparatuses 1 as a target.

<Remote Diagnosis and Machine-Differential Analysis>

In the above-described embodiment (FIG. 1), the example of the anomaly monitoring and others performed to one apparatus 1 as the target has been described. As shown in FIG. 26, when the plurality of same-type apparatuses 1 are simultaneously monitored, the anomaly sign can be detected by comparison between the apparatuses 1 (machine-differential analysis).

FIG. 26 shows a configuration example of a computer system on which a system (apparatus remote maintenance system) achieving the apparatus maintenance method is installed. The plurality of (for example, three) same-type apparatuses 1 {1a, 1b, and 1c} each located at a remote place are provided. In each apparatus 1, similarly to the above descriptions, a plurality of sensors S are provided. Also, sensor information management computers 51a, 51b, and 51c each serving as an interface of the state measurement data DS of each of the apparatus 1a, 1b, and 1c to collect the data are provided. Further, similarly to FIGS. 1 and 2, on an apparatus remote monitoring computer 52B, the modules such as the model creation module 2, the monitoring execution module 3, the anomaly diagnosis module 4, the part lifetime prediction module 5, and the maintenance plan module 6 are installed by a hardware and a software, and they execute the process for the data (DS) collected from each of the sensor information management computers 51a, 51b, and 51c via a network 99 or others. Still further, the maintenance management computer 53B is connected to the apparatus remote monitoring computer 52B. On the maintenance management computer 53B, the maintenance operation instruction module 7 and the maintenance history record module 8 as described above are installed by a hardware and a software, and they execute the process related to the maintenance. Still further, maintenance apparatuses 54a, 54b, and 54c used by a maintenance operator are provided for each apparatus 1, are connected to the maintenance management computer 53 via the network 99 or others, and serve as interfaces for the maintenance operation and the maintenance history collection similarly to FIG. 2.

When the predictive model (Equation (3) for the predicted value (PY)) corresponding to the above-described collinearity data item (XA) is extended for the plurality of same-type apparatuses 1 in the fifth embodiment, the following Equation (12) is obtained.

(Equation 12)

$$\hat{P}_k(t, m, \xi) = \\ (a_{m0} + b_{m0}(\xi)) + (a_{mm} + b_{mm}(\xi)) \cdot P_m(t) + \sum_n (a_{mn} + b_{mn}(\xi)) \cdot P_n(t) \quad (12)$$

In the above-described Equation (12), a symbol "$P_k$" represents an objective-variable data item (Y) with a symbol "k" as an identification number, a symbol "$P_m$" represents a collinearity explanatory-variable data item (XA) with a symbol "m" as an identification number, and a symbol "$P_n$" represents an independency explanatory-variable data item (XE) with a symbol "n" as an identification number. A symbol "t" among parameters in parentheses in each data item represents an operating time of each of the apparatuses 1. Each symbol "a" represents a coefficient of a common linear regression equation among the apparatuses 1, a left index of a two-digit index represents a type of the collinearity explanatory-variable data item (XA) corresponding to the predictive model, and a right index thereof represents a type of the explanatory-variable data item (X). Note that a symbol "a" whose right index is 0 represents a common intercept of the regression equation. Each symbol "b" represents a coefficient (regression coefficient inter-apparatus deviation parameter) of a linear regression equation expressing a difference among the apparatuses 1, and a left index of a two-digit index represents a type of the collinearity explanatory-variable data item (XA) corresponding to the predictive model, and a right index thereof represents a type of the explanatory-variable data item (X). Note that a symbol "b" whose right index is 0 represents an intercept of the regression equation expressing a difference among the apparatuses 1. A symbol "$\xi$" represents an apparatus number.

Even if all of the plurality of apparatuses 1 are in the normal state, a case that all regression coefficients are matched with each other to establish a relation "b=0" is not general. Accordingly, a predetermined model coefficient deviation threshold is previously set, and a magnitude of the regression coefficient inter-apparatus deviation parameter b is judged for each model creation repeated in a predetermined cycle. If the magnitude of the parameter has exceeded the model coefficient deviation threshold, it may be set that the anomaly sign is detected. The model coefficient deviation threshold can be defined by a magnitude of variation or a standard deviation of the regression coefficient inter-apparatus deviation parameters b of the apparatuses 1 in a normal state.

In this manner, the comparison can be achieved not only between the state data items of the single apparatus 1 but also among those of the plurality of apparatuses 1, and therefore, the fifth embodiment has an effect that the anomaly sign can be easily detected.

<Target Apparatus>

In the above-described embodiment, as the apparatus 1, the energy conversion apparatus represented by the cogeneration apparatus has been described as the target. However, the apparatus is not limited to this. For example, the present invention can be applied to an apparatus which converts wind power or wave power to at least one of kinetic energy and electrical energy instead of burning the fuel. In this case, as the objective-variable data item (Y), at least one of a kinetic output, a power output, and an energy conversion efficiency of the energy conversion apparatus may be selected. The explanatory-variable data item (X) includes at least one of a wind speed, a motion speed of a mechanical part, oscillation of the mechanical part, acceleration of the mechanical part, distortion of the mechanical part, audio of the mechanical part, abrasion loss of the mechanical part, a component of lubricating oil, a pressure of the lubricating oil, a temperature of the lubricating oil, a voltage of an electrical part, a current of the electrical part, a frequency of the electrical part, an environmental temperature, an environmental humidity, an environmental atmospheric pressure, a voltage of an electric power system, a current of the electric power system, an operating time of the apparatus, and an operating time of a part.

Also, the present invention can be applied to an apparatus which converts geothermal heat to at least one of kinetic energy, thermal energy, and electrical energy. In this case, as the objective-variable data item (Y), at least one of a kinetic output, a thermal output, an electric power output, and an energy conversion efficiency of the energy conversion apparatus may be selected. The explanatory-variable data item (X) includes at least one of a supply amount of water vapor, a temperature of the water vapor, a pressure of the water vapor, a motion speed of a mechanical part, oscillation of the mechanical part, acceleration of the mechanical part, distortion of the mechanical part, audio of the mechanical part, abrasion loss of the mechanical part, a component of lubricating oil, a pressure of the lubricating oil, a temperature of the lubricating oil, electric power of an electrical part, reactive power of the electrical part, a voltage of the electrical part, a current of the electrical part, a frequency of the electrical part, an environmental temperature, an environmental humidity, an environmental atmospheric pressure, a voltage of an electric power system, a current of the electric power system, operating time of the apparatus, and operating time of a part, which are not overlapped with the objective variable (Y).

Further, the present invention can be applied to an electric motor apparatus converting electrical energy to mechanical energy. As an example of the electric motor apparatus, an elevating machine represented by an elevator or an escalator, plant equipment represented by a pump or a compressor, and a machine tool represented by a lathe, a drilling machine, a milling machine, and a grinder are cited. In this case, as the objective-variable data item (Y), at least one of a workload of a mechanical part, a motion speed of the mechanical part, oscillation of the mechanical part, acceleration of the mechanical part, distortion of the mechanical part, audio of the mechanical part, abrasion loss of the mechanical part, and an energy conversion efficiency may be selected. The explanatory-variable data item (X) includes at least one of a motion speed of a mechanical part, oscillation of the mechanical part, acceleration of the mechanical part, distortion of the mechanical part, audio of the mechanical part, abrasion loss of the mechanical part, a component of lubricating oil, a pressure of the lubricating oil, a temperature of the lubricating oil, electric power of an electrical part, reactive power of the electrical part, a voltage of the electrical part, a current of the electrical part, a frequency of the electrical part, an environmental temperature, an environmental humidity, an environmental atmospheric pressure, operating time of the apparatus, and operating time of a part, which are not overlapped with the objective variable (Y).

Still further, the present invention can be applied to a plasma processing apparatus converting electrical energy to plasma energy. As an example of the plasma processing apparatus, a semiconductor processing apparatus represented by a semiconductor etching apparatus or a semiconductor deposition apparatus is cited. In this case, as the objective-variable data item (Y), at least one of a semiconductor processing amount, a deposition amount, process uniformity on a semiconductor wafer surface, deposition uniformity on the semiconductor wafer surface, or an energy conversion efficiency may be selected. The explanatory-variable data item (X) includes at least one of abrasion loss of a mechanical part, electric power of the electrical part, reactive power of the electrical part, a voltage of the electrical part, a current of the electrical part, a frequency of the electrical part, impedance of the electrical part, a temperature of processing-room environment, a pressure of the processing-room environment, light emission of the processing-room environment, operating time of the apparatus, and operating time of a part.

In the foregoing, the invention made by the inventors has been concretely described based on the embodiments. However, it is needless to say that the present invention is not limited to the foregoing embodiments and various modifications and alterations can be made within the scope of the present invention.

INDUSTRIAL APPLICABILITY

The present invention can be used for an apparatus anomaly monitoring system, an apparatus maintenance system, and others.

The invention claimed is:

1. An apparatus anomaly monitoring method with using information processing of a computer, the method of performing processes of, based on a plurality of state data items of a target apparatus obtained by measuring a state of the apparatus with a plurality of sensors, monitoring and judging an anomaly of the state of the apparatus, wherein
the method includes:
a first step of performing a model creating process of creating a plurality of individual models for the monitoring and judgment based on the plurality of state data items of the apparatus at a normal time; and
a second step of performing a monitoring execution process of inputting the plurality of state data items of the apparatus at a predetermined time unit, monitoring and judging the anomaly of the state of the apparatus with using the plurality of individual models, and, when the anomaly is detected, outputting detection information,
the first step includes:
a step of categorizing the plurality of state data items into an objective-variable data item and two or more explanatory-variable data items other than the objective-variable data item in regression analysis; and
a step of creating the individual model of predicting the objective-variable data item from the one explanatory-variable data item for each of the explanatory-variable data items as two or more individual models configuring an ensemble of the models to configure the ensemble of the models, and
the second step includes, for inputs of the plurality of state data items:
a step of computing an individual predicted value of the objective-variable data item for each of the individual models configuring the ensemble of the models with taking the explanatory-variable data item as an input;
a step of computing an individual error span between the predicted value and a measurement value of the objective-variable data item for each of the individual predicted values;
a step of computing an ensemble error span in combination with the plurality of error spans obtained for each of the explanatory-variable data items; and
a step of detecting the anomaly of the apparatus by comparing the ensemble error span and a threshold.

2. The apparatus anomaly monitoring method according to claim 1, wherein
the first step includes
a step of categorizing the two or more explanatory-variable data items into a collinearity data item with a large cross-correlation strength and an independency data item other than the collinearity data item, and,
in the step of creating the two or more individual models configuring the ensemble of the models, an individual model of predicting the objective-variable data item from the one collinearity explanatory-variable data item is created for each of the collinearity explanatory-variable data items.

3. The apparatus anomaly monitoring method according to claim 1, wherein
the method includes a third step of performing a process of diagnosing a content of the anomaly of the apparatus based on the detection information obtained when the anomaly is detected in the second step, and,
in the third step, a process is performed in which state data items causing the ensemble error span to exceed the threshold are ranked and specified as candidates, and information indicating the candidates of the cause is outputted.

4. The apparatus anomaly monitoring method according to claim 3, wherein
the method includes a fourth step of performing, based on the information indicating the candidates of the cause obtained in the third step, a process of computing a lifetime of a part of the apparatus corresponding to the data item of the cause and outputting information about the lifetime.

5. The apparatus anomaly monitoring method according to claim 4, wherein
the method includes a fifth step of performing, with using the information about the lifetime of the part obtained in the fourth step, a process of creating maintenance plan information containing a schedule for a maintenance operation for the part of the apparatus performed by a maintenance operator and outputting the maintenance plan information as a maintenance operation instruction.

6. The apparatus anomaly monitoring method according to claim 3, wherein,
in the third step, a process is performed in which parts of the apparatus corresponded to state data items causing the ensemble error span to exceed the threshold are ranked and specified as candidates of parts, and information indicating the candidates of parts is outputted.

7. The apparatus anomaly monitoring method according to claim 3, wherein,
in the third step, each state data item of the cause is specified by analyzing a causational relation among the plurality of state data items with using a cross-correlation function.

8. The apparatus anomaly monitoring method according to claim 7, wherein,
in the third step, each state data item of the cause is specified by examining a rank of change occurrence of each of the explanatory-variable data items in vicinity of a changing point of the objective-variable data item on a time axis.

9. The apparatus anomaly monitoring method according to claim 1, wherein,
in the step of computing the ensemble error span, the ensemble error span is an ensemble maximum value obtained as a maximum value among the plurality of individual error spans.

10. The apparatus anomaly monitoring method according to claim 1, wherein,
in the step of computing the ensemble error span, the ensemble error span is an ensemble average value obtained as an average value among the plurality of individual error spans.

11. The apparatus anomaly monitoring method according to claim 1, wherein,
in the step of computing the ensemble error span, the ensemble error span is a shape of distribution or a statistical quantile of the ensemble of the plurality of individual error spans.

12. The apparatus anomaly monitoring method according to claim 1, wherein,
in the step of computing the ensemble error span, the ensemble error span is an effective value obtained as a root mean square of the plurality of individual error spans.

13. The apparatus anomaly monitoring method according to claim 1, wherein,
in the second step, a normalized error span is computed by normalizing a magnitude of a value of each of the individual error spans, and then, the ensemble error span in combination with the plurality of normalized error spans is computed.

14. The apparatus anomaly monitoring method according to claim 1, wherein,
in the second step,
in the step of computing the ensemble error span, an ensemble average value obtained as an average value among the plurality of individual error spans and an ensemble maximum value obtained as a maximum value among the plurality of individual error spans are computed as the ensemble error span,
a differential value between the ensemble average value and the ensemble maximum value is computed,
when the differential value is smaller than a predetermined threshold, it is judged that a large-area anomaly related to a plurality of state data items of the apparatus occurs, and, when the differential value is larger than the predetermined threshold, it is judged that a local-area anomaly restricted to a part of the state data items of the apparatus occurs.

15. The apparatus anomaly monitoring method according to claim 1, wherein
either of a linear regression model or a non-linear model is used for each of the explanatory-variable data items as the plurality of individual models configuring the ensemble of the models, and, both of the linear regression model and the non-linear model are mixed to be used as the ensemble of the models.

16. An apparatus anomaly monitoring system with using information processing of a computer, the system of performing processes of, based on a plurality of state data items of a target apparatus obtained by measuring a state of the apparatus with a plurality of sensors, monitoring and judging an anomaly of the state of the apparatus, wherein
the system includes a computer configured to perform:
a first step of performing a model creating process of creating a plurality of individual models for the monitoring and judgment based on the plurality of state data items of the apparatus at a normal time; and
a second step of performing a monitoring execution process of inputting the plurality of state data items of the apparatus at a predetermined time unit, monitoring and judging the anomaly of the state of the apparatus with using the plurality of individual models, and, when the anomaly is detected, outputting detection information,
wherein the first step perform:
a process of categorizing the plurality of state data items into an objective-variable data item and two or more explanatory-variable data items other than the objective-variable data item in regression analysis; and
a process of configuring an ensemble of the models by creating the individual model of predicting the objective-variable data item from the one explanatory-variable data item for each of the explanatory-variable data items as two or more individual models configuring the ensemble of the models, and
wherein the second step perform, for inputs of the plurality of state data items:
a process of computing an individual predicted value of the objective-variable data item for each of the individual models configuring the ensemble of the models with taking the explanatory-variable data item as an input;
a process of computing an individual error span between the predicted value and a measurement value of the objective-variable data item for each of the individual predicted values;
a process of computing an ensemble error span in combination with the plurality of error spans obtained for each of the explanatory-variable data items; and
a process of detecting the anomaly of the apparatus by comparing the ensemble error span and a threshold.

17. The apparatus anomaly monitoring system according to claim 16, wherein
the first step perform
a process of categorizing the two or more explanatory-variable data items into a collinearity data item with a large cross-correlation strength and an independency data item other than the collinearity data item, and,
in the process of creating the two or more individual models configuring the ensemble of the models, an individual model of predicting the objective-variable data item from the one collinearity explanatory-variable data item is created for each of the collinearity explanatory-variable data items.

* * * * *